(12) United States Patent
Zou

(10) Patent No.: US 6,905,988 B2
(45) Date of Patent: *Jun. 14, 2005

(54) SUBSTRATE FOR INFORMATION RECORDING MEDIUM AND MAGNETIC RECORDING MEDIUM COMPOSED OF CRYSTALLIZED GLASS

(75) Inventor: Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/612,015

(22) Filed: Jul. 3, 2003

(65) Prior Publication Data

US 2004/0018929 A1 Jan. 29, 2004

Related U.S. Application Data

(62) Division of application No. 09/610,687, filed on Jul. 7, 2000, now Pat. No. 6,627,566.

(30) Foreign Application Priority Data

| Jul. 7, 1999 | (JP) | 1999/193574 |
| Oct. 14, 1999 | (JP) | 1999/293003 |

(51) Int. Cl.$^7$ ............................................. C03C 10/04
(52) U.S. Cl. ......................... 501/5; 501/10; 428/694 ST
(58) Field of Search ................. 501/5, 10; 428/694 ST, 428/694 SG

(56) References Cited

U.S. PATENT DOCUMENTS

| 2,516,553 | A | | 7/1950 | Cole |
| 5,476,821 | A | | 12/1995 | Beall et al. |
| 5,491,116 | A | | 2/1996 | Beall et al. |
| 5,532,194 | A | | 7/1996 | Kawashima et al. |
| 5,763,059 | A | | 6/1998 | Yamaguchi et al. |
| 6,124,223 | A | | 9/2000 | Beall et al. |
| 6,245,411 | B1 | | 6/2001 | Goto et al. |
| 6,294,490 | B1 | | 9/2001 | Zou et al. |
| 6,344,423 | B2 | | 2/2002 | Goto et al. |
| 6,429,160 | B1 | | 8/2002 | Nakajima et al. |
| 6,503,857 | B2 | * | 1/2003 | Nakajima et al. ............. 501/10 |
| 6,599,606 | B1 | * | 7/2003 | Zou .......................... 428/64.2 |
| 6,627,565 | B1 | * | 9/2003 | Zou et al. ....................... 501/4 |
| 6,627,566 | B1 | * | 9/2003 | Zou .............................. 501/5 |
| 2002/0032113 | A1 | | 3/2002 | Nakajima et al. |

FOREIGN PATENT DOCUMENTS

| DE | 127 795 | | 10/1977 |
| EP | 0 265 045 | | 4/1988 |
| EP | 0 289 943 | | 11/1988 |
| EP | 1 057 794 | | 12/2000 |
| GB | 2 172 282 | | 9/1986 |
| JP | 1-239036/89 | | 9/1989 |
| JP | 291660/95 | | 11/1995 |
| JP | 9-77531/97 | | 3/1997 |
| JP | 2648673 | | 5/1997 |
| JP | 11-278864 | * | 10/1999 |
| JP | 11278864 | | 10/1999 |
| JP | 11-278865 | * | 10/1999 |
| JP | 2000-169184 | * | 6/2000 |
| JP | 2000-169186 | * | 6/2000 |
| JP | 2000-185940 | * | 7/2000 |

OTHER PUBLICATIONS

Hideki, O., Patent Abstracts of Japan, vol. 1995, No. 5 (Jun. 30, 1995).
Tetsuo, M., Patent Abstracts of Japan, vol. 2000, No. 1 (Jan. 31, 2000).
Gakuroku, S., Patent Abstracts of Japan, vol. 2000, No. 2 (Feb. 29, 2000).
Koji, A., Patent Abstracts of Japan, vol. 2000, No. 9 (Oct. 13, 2000).
Pinckney, L. R. et al., "Nanocrystalline non–alkali glass–ceramics", Journal of Non–Crystalline Solids 219 (1997) pp. 219–227.
Vogel, Heindenreich E., et al., "High Mechanical Strength Glass Ceramics Containing Titanium Dioxide", German Patent Document No. 127 795, Published Oct. 12, 1977, pp. 1–14, (English Language Translation).

* cited by examiner

*Primary Examiner*—Karl Group
(74) *Attorney, Agent, or Firm*—Burns, Doane, Swecker & Mathis, L.L.P.

(57) ABSTRACT

Provided is a substrate for information recording medium composed of such a crystallized glass as having high Young's modulus, strength and heat resistance, being excellent in surface smoothness, surface homogeneity and surface processability, as well as having a relatively low temperature of glass liquid phase and being capable of producing cheaply, and an information recording medium using this substrate.

The crystallized glass substrate for information recording medium comprising 35–65 mol % of $SiO_2$, 5–25 mol % of $Al_2O_3$, 10–40 mol % of MgO and 5–15 mol % of $TiO_2$, in which the total amount of aforementioned composition is at least equal to or higher than 92 mol % and the main crystals are enstatite and/or its solid solution. The information recording medium having this substrate and a recording layer formed on said substrate.

30 Claims, 1 Drawing Sheet

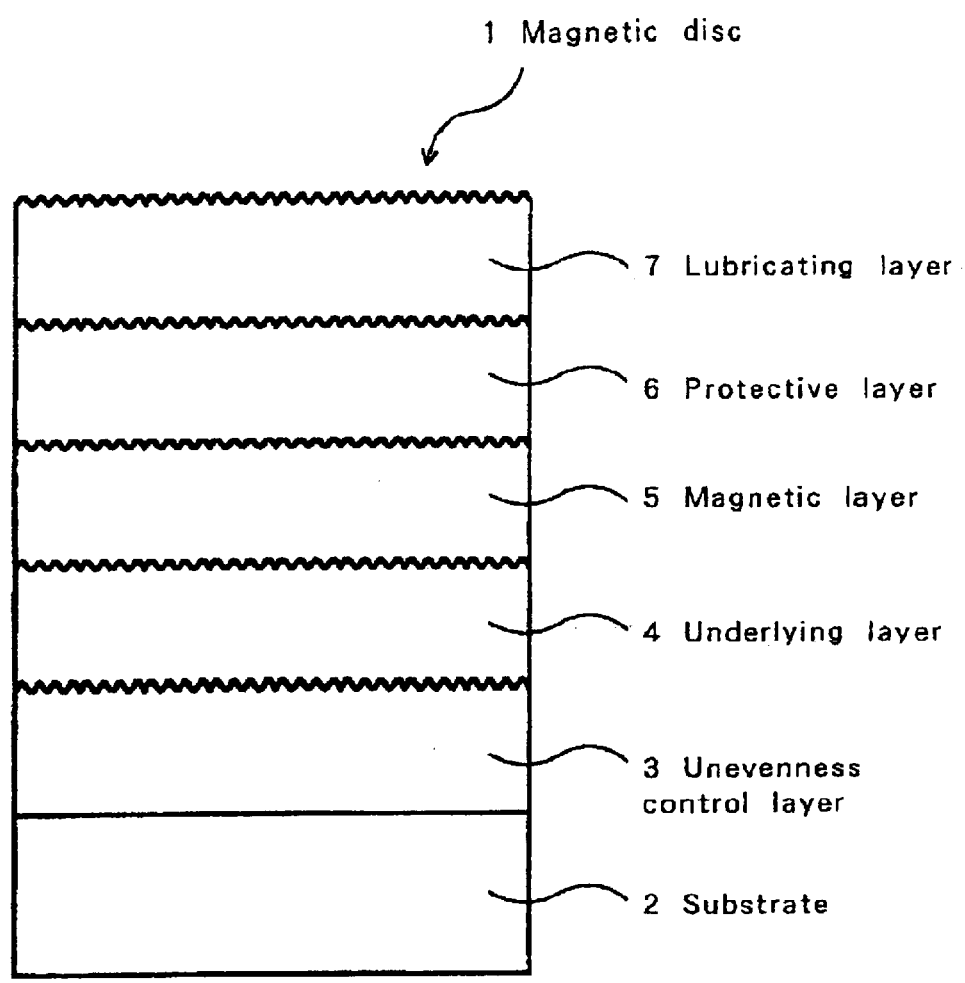

SUBSTRATE FOR INFORMATION RECORDING MEDIUM AND MAGNETIC RECORDING MEDIUM COMPOSED OF CRYSTALLIZED GLASS

This application is a divisional of application Ser. No. 09/610,687, filed on Jul. 7, 2000, now U.S. Pat. No. 6,627,566.

BACKGROUND OF THE INVENTION

1. Field of the Invention

This invention relates to crystallized glasses suitable for substrates which are used for information recording media, such as magnetic disks, optical disks and optical magnetic disks, substrates for information recording media composed of this crystallized glass, and information recording media using said substrate for information recording medium.

2. Description of the Related Art

Major components of magnetic storage devices of electronic computers and the like are a magnetic recording medium and a magnetic head for reconstruction of magnetically recorded information. Flexible disks and hard disks have been known as magnetic recording media. As substrates for hard disks, aluminum alloy has been mainly used. Recently, flying height of magnetic heads is markedly reduced as hard disk drivers for notebook personal computers are made smaller and their magnetic recording density made higher. Accordingly, extremely high precision has been demanded for the surface smoothness of magnetic disk substrates. However, it is difficult to produce smooth surface more than a certain level of precision with an aluminum alloy. That is, even though it is polished using highly precise abrasives and processing apparatuses, the polished surface may suffer from plastic deformation because of the low hardness of the alloy. Even if the aluminum alloy is plated with nickel-phosphorous, the surface roughness Ra cannot be made equal to or less than 5 Å (angstrom). In addition, as hard disk drivers are made smaller and thinner, a further smaller thickness of substrates for magnetic disks is also strongly desired. However, it is difficult to produce such a thin disk with an aluminum alloy having a certain strength defined by specification of hard disk drivers because of low strength and stiffness of aluminum alloy.

Therefore, glass substrates for magnetic disks of which high strength, high stiffness, high impact resistance and high surface smoothness are required have been developed. Among these, chemically reinforced glass substrates whose surfaces are strengthened by the ion exchange technique, crystallized glass substrates subjected to crystallization treatment and the like have been known well.

As a chemically reinforced glass substrate by ion-exchange, for example, a glass disclosed in Japanese Patent Unexamined Publication No.Hei. 1-239036 (JP-A-239036/89) has been known. This chemically reinforced glass substrate is such a glass substrate for magnetic disks as the glass containing, indicated in terms of % by weight, 50–65% of $SiO_2$, 0.5–14% of $Al_2O_3$, 10–32% of $R_2O$ where R is an alkali metal ion, 1–15% of ZnO and 1.1–14% of $B_2O_3$ is reinforced by forming a crushing stress layer on the glass substrate with an ion exchange method by an alkali ion.

In addition, as a crystallized glass, for example, a glass disclosed in Japanese Patent Examined Publication No.2516553 is exemplified. This crystallized glass is such a crystallized glass for magnetic disks which contains, indicated in terms of % by weight, 65–83% of $SiO_2$, 8–13% by $Li_2O$, 0–7% of $K_2O$, 0.5–5.5% of MgO, 0–5% of ZnO, 0–5% of PbO (provided that MgO+ZnO+PbO is 0.5–5%), 1–4% of $P_2O_5$, 0–7% of $Al_2O_3$ and 0–2% of $As_2O_3+Sb_2O_3$, and contains micro crystalline particles of $Li_2O.2SiO_2$ as main crystals.

Moreover, a crystallized glass is also disclosed in Japanese Patent Unexamined Publication No.Hei.7-291660 (JP-A-291660/95). This crystallized glass is obtained by heat treatment after fusion and forming a glass which consists of, indicated in terms of % by weight, 38–50% of $SiO_2$, 18–30% of $Al_2O_3$, 10–20% of MgO, provided that having a composition containing, indicated in terms of weight ratio, 1.2–2.3 of $Al_2O_3$/MgO, 0%–5% of $B_2O_3$, 0%–5% of CaO, 0%–5% of BaO, 0%–5% of SrO, 0.5%–7.5% of ZnO, 4%–15% of $TiO_2$, 0%–5% of $ZrO_2$ and 0%–2% of $As_2O_3$ and/or $Sb_2O_3$. This glass is a cordierite based crystallized glass characterized by containing cordierite based crystals as crystals. Moreover, a substrate for magnetic disks composed of this crystallized glass is also disclosed.

In addition, a crystallized glass is also disclosed in Japanese Patent Unexamined Publication No.Hei.9-77531 (JP-A-77531/97) (U.S. Pat. No. 5,476,821). This crystallized glass is a ceramic product having the Young's modulus in the range of from about $14 \times 10^6$–about $24 \times 10^6$ psi (96–165 GPa) and the fracture toughness of more than 10 MPa.m$^{1/2}$. In addition, this crystallized glass consists of crystalline phase laminated body which mainly consists of crystals having a spinel structure and a uniform size and dispersing uniformly in a siliceous-rich residual matrix. This is a glass ceramic which substantially consists of, indicated in terms of % by weight using oxides as a standard, 35–60% of $SiO_2$, 20–35% of $Al_2O_3$, 0–25% of MgO, 0–25% of ZnO, 0–20% of $TiO_2$, 0–10% of $ZrO_2$, 0–2% of $Li_2O$ and 0–8% of NiO. This has at least about 10% of a total amount of MgO+ZnO and may contain equal to or less than 5% of an optional component selected from the group composed of BaO, CaO, Pbo, SrO, $P_2O_5$, $B_2O_3$ and $Ga_2O_3$, in the range of from 0 to 5% of $R_2O$ selected from the group consisting of $Na_2O$, $K_2O$, $Rb_2O$ and $Cs_2O$, and in the range of from 0 to 8% of transition metals. In the case of containing less than about 25% of $Al_2O_3$, this is a glass ceramic having a composition in which the total amount of $TiO_2+ZrO_2+NiO$ is equal to or more than 5%. In above publication, the substrate for magnetic disks consisting of this glass ceramic is disclosed.

In addition, a crystallized glass is also disclosed in U.S. Pat. No. 5,491,116. This crystallized glass is a glass ceramic product having the fracture coefficient of at least about 15,000 psi, the Knoop hardness exceeding about 760 KHN, the Young's modulus of more than about $20 \times 10^6$ psi and the fracture toughness of more than 1.0 MPa.m$^{1/2}$. The main crystals of the crystallized glass are enstatite or its solid solution and spinel (spinel structure crystal), and the crystallized glass contains at least 92% of the composition substantially composed of, indicated in terms of % by weight, 35–60% of $SiO_2$, 10–30% of $Al_2O_3$, 12–30% of MgO, 0–10% of ZnO, 5–20% of $TiO_2$ and 0–8% of NiO. Moreover, the substrate for magnetic disks composed of this crystallized glass is also disclosed. It is to be noted that the same glass as the crystallized glass disclosed in aforementioned patent is also disclosed in Journal of Non-Crystalline Solids 219(1997) 219–227.

However, along with making hard disks smaller and thinner and making recording density higher, it is rapidly developed to make flight height of magnetic heads smaller and revolution speed of disks higher. Thereby, substrate materials are more strictly required the strength, the Young's modulus, the smoothness of the surface and the like. In particular, by making the information recording density of 3.5-inch hard disks for personal computers and severs higher, the surface smoothness and the surface flatness of the substrate materials are strictly required. In addition, corresponding to the higher data processing speed, it is required to set the winding number of the disks equal to or higher than 10,000 rpm. Thus, the requirement for stiffness of substrate materials becomes increasingly severer, and the limitation of conventional aluminum substrates already becomes obvious. In future, as long as it is necessarily demanded to make the capacity of hard disks higher and to make the revolution speed of hard disks higher, it is clear that the substrate materials for magnetic recording medium is strongly required to exhibit higher Young's modulus, higher strength, more excellent surface flatness, higher impact resistance and the like.

However, such a chemically reinforced glass as disclosed in Japanese Patent Unexamined Publication No.Hei.1-239036 (JP-A-239036/89) mentioned above has the Young's modulus of about 80 GPa, therefore, it cannot meet the strict demand for hard disks in future. As for conventional chemically reinforced substrate glasses, alkali ions are introduced in a large amount in the glass for ion exchange, so that the reinforced glasses mostly have the low Young's modulus (90 GPa). Moreover, due to also having low stiffness, it cannot meet 3.5-inch high-end disk substrates and thinner disk substrates. In addition, the glass chemically reinforced by ion exchange contains large amount of alkali components. Thus, if it is used for long hours under the circumstance of high temperature and high humidity, alkali ions deposit from parts including thin magnetic films or exposing glasses, such as a pinhole part of a magnetic film or a circumference of a magnetic film. It has a disadvantage that this triggers a corrosion or decomposition of the magnetic films. In the producing process of the magnetic recording medium, after providing a magnetic layer on the glass substrate, certain heat treatment may be carried out in order to improve characteristics such as coercive force of the magnetic layer. However, the conventional ion-exchanged reinforced glass mentioned above has at most 500° C. of the glass transition temperature, so that it has poor heat resistance. Thereby, it has a problem that higher coercive force cannot be obtained.

In addition, the conventional crystallized glass as disclosed in Japanese Patent Publication No. 2516553 mentioned above is superior a little in the Young's modulus and heat resistance than aforementioned chemically reinforced glass substrate. However, the surface roughness is equal to or higher than 10 Å, thereby the surface smoothness is poor, so that it is limited to make the flying height smaller. Therefore, it has a problem that it cannot meet higher magnetic recording density. Moreover, the Young's modulus is about from 90 to 100 GPa at most, so that it also cannot meet 3.5-inch high-end disk substrates and thinner disk substrates.

In addition, the crystallized glass disclosed in Japanese Patent Unexamined Publication No.Hei.7-291660 (JP-A-291660/95) mentioned above has the Young's modulus of about from 100 to 130 GPa, therefore, it cannot be said that it is sufficient. Moreover, it has only such a surface smoothness as having the Young's modulus of about 8 Å, resulting in poor smoothness. Additionally, the temperature of glass liquid phase is high which is 1400° C., so that it has a disadvantage of difficulty in producing.

Moreover, the crystallized glass disclosed in Japanese Patent Unexamined Publication No.Hei.9-77531 (JP-A-77531/97) mentioned above has a disadvantage of large difficulty in polishing because the main crystals are spinel.

Moreover, a large amount of enstatite is contained together with spinel in the crystallized glass disclosed in U.S. Pat. No. 5,491,116 and Journal of Non-Crystalline Solids 219(1997) 219–227. Accordingly, it can be considered that easiness in polishing is more improved than the crystallized glass disclosed in Japanese Patent Unexamined Publication No.Hei.9-77531 (JP-A-77531/97). However, because spinel is still contained therein, it is difficult to say that it has sufficient polishing characteristics. That is, it still takes a long time for polishing required for obtaining desirable surface roughness, so that it has a problem of inferior productivity.

Moreover, because a glass disclosed in Japanese Patent Publication No.2648673 is a fire-resistant glass ceramic for the purpose of using temperature equal to or higher than 1200° C., it is difficult to be used as a substrate for information recording medium. That is, it is difficult to be produced due to high melting temperature, moreover, the surface smoothness required for information recording medium cannot be obtained due to large crystal size.

SUMMARY OF THE INVENTION

Therefore, it is an object of the present invention to provide a substrate for information recording medium, such as magnetic disks and the like, consisting of crystallized glass which has higher Young's modulus, higher strength and higher fire-resistance, superior in the surface smoothness, surface homogeneity and surface processability with considering demands that a substrate for magnetic recording medium will be made thinner and will have high strength, high heat resistance, high impact resistance and the like in near future, as well as it can be cheaply produced due to comparatively low temperature of the glass liquid phase.

Moreover, it is also an object of the present invention to provide information recording media using the substrate composed of aforementioned crystallized glass, such as magnetic disks.

In addition, the present invention provides a production method of the substrate for information recording medium composed of aforementioned crystallized glass.

To solve objects mentioned above, the inventors carried out various examinations, as results, it is found that crystallized glass suitable for substrate for information recording medium which has high Young's modulus equal to or higher than 140 GPa, good surface smoothness, and comparatively low liquid temperature. Then, they accomplished the present invention.

The present invention relates to a substrate for information recording medium (hereinafter referred to substrate 1) composed of crystallized glass comprising
$SiO_2$: 35–65 mol %
$Al_2O_3$: 5–25 mol %
MgO: 10–40 mol % and
$TiO_2$: 5–15 mol %,
wherein the sum of the above components is equal to or more than 92 mol %, andmain crystals contained in the crystallized glass are enstatite and/or its solid solution.

With the substrate above, a molar ratio of $Al_2O_3$ to MgO ($Al_2O_3$/MgO) may be from equal to or more than 0.2 to less than 0.5.

With the substrate above, the crystallized glass preferably comprises
$SiO_2$: 40–60 mol %
$Al_2O_3$: 7–22 mol %
MgO: 12–35 mol % and
$TiO_2$: 5.5–14 mol %.

With the above substrate 1, the crystallized glass may comprise $Y_2O_3$ in an amount equal to or less than 10 mol %.

With the above substrate 1, the crystallized glass may comprise $ZrO_2$ in an amount equal to or less than 10 mol %.

The present invention further relates to a substrate for information recording medium (hereinafter referred to substrate 2) composed of crystallized glass consisting essentially of
$SiO_2$: 35–65 mol %
$Al_2O_3$: 5–25 mol %
MgO: 10–40 mol %
$TiO_2$: 5–15 mol %
$Y_2O_3$: 0–10 mol %
$ZrO_2$: 0–10 mol %
$R_2O$: 0–5 mol % (wherein R is at least one selected from the group of Li, Na and K)
RO: 0–5 mol % (wherein R is at least one selected from the group of Ca, Sr and Ba)
$As_2O_3+Sb_2O_3$: 0–2 mol %
$SiO_2+Al_2O_3+MgO+TiO_2$: 92 mol % or more;
and main crystals contained in the crystallized glass are enstatite and/or its solid solution.

The present invention further relates to a substrate for information recording medium (hereinafter referred to substrate 3) composed of crystallized glass consisting essentially of
$SiO_2$: 35–65 mol %
$Al_2O_3$: 5–25 mol %
MgO: 10–40 mol %
$TiO_2$: 5–15 mol %
$Y_2O_3$: 0–10 mol %
$ZrO_2$: 0–10 mol %
$R_2O$: 0–5 mol % (wherein R is at least one selected from the group of Li, Na and K)
RO: 0–5 mol % (wherein R is at least one selected from the group of Ca, Sr and Ba)
$As_2O_3+Sb_2O_3$: 0–2 mol %
$SiO_2+Al_2O_3+MgO+TiO_2$: 92 mol % or more;
and the crystallization degree of the crystallized glass is in a range of 20 to 70 vol %.

With the above substrates 1–3, the crystallized glass may comprise $Y_2O_3$ in an amount of 0.3 to 8 mol %.

With the above substrates 1–3, the crystallized glass may comprise $ZrO_2$ in an amount of 1 to 10 mol %.

With the above substrates 1–3, the crystallized glass may comprise $ZrO_2$ in an amount of 1 to 5 mol %

With the above substrate 1, the crystallized glass may comprise $R_2O$ in an amount of 1 to 5 mol %, wherein R is at least one selected from the group of Li, Na and K.

The $R_2O$ is preferably $K_2O$.

With the above substrates 1–3, the crystallized glass may comprise $TiO_2$ in an amount of 8 to 14 mol %.

With the above substrates 1–3, the substrate may exhibit a Young modulus equal to or more than 140 Gpa.

With the above substrate 1, the crystallized glass may comprise
$SiO_2$: 35–43 mol %,
$Al_2O_3$: 9–20 mol %,
MgO: 30–39 mol %,
$Y_2O_3$: 1–3 mol %,
$TiO_2$: 8.5–15 mol %, and
$ZrO_2$: 1–5 mol %.

With this substrate, a molar ratio of $Al_2O_3$ to MgO ($Al_2O_3/MgO$) may be equal to or more than 1.35, and the substrate may exhibit a Young modulus equal to or more than 160 GPa.

With the above substrates 1–3, the mean particle size of the crystal particles contained in the crystallized glass may be equal to or less than 100 nm.

With the above substrates 1–3, the mean particle size of the crystal particles contained in the crystallized glass is equal to or less than 70 nm.

With the above substrates 1–3, the substrate may have a polished surface with a surface roughness Ra (JIS B0601) equal to or less than 1 nm.

The present invention further relates to a substrate for information recording medium (hereinafter referred to substrate 4) composed of crystallized glass comprising enstatite and/or its solid solution as main crystals and the substrate has a polished surface with a surface roughness Ra (JIS B0601) equal to or less than 1 nm.

With this substrate 4, the substrate may have a polished surface with a surface roughness Ra (JIS B0601) equal to or less than 0.5 nm.

With the above substrate 1–4, light transparency at 600 nm through the substrate with 1 mm thickness maybe equal to or more than 10%.

With the above substrate 1–4, thermal extension coefficient of the crystallized glass may in the range of from $65 \times 10^{-7}$ to $85 \times 10^{-7}/°$ C.

The present invention further relates to a substrate for information recording medium (hereinafter referred to substrate 5) composed of crystallized glass comprising enstatite and/or its solid solution as main crystals and the mean particle size of the crystal particles contained in the crystallized glass as main crystals is equal to or less than 100 nm.

With this substrate 5, the mean particle size of the crystal particles contained in the crystallized glass as main crystals ay be equal to or less than 70 nm.

The present invention further relates to a substrate for information recording medium (hereinafter referred to substrate 6) composed of crystallized glass comprising enstatite and/or its solid solution as main crystals and light transparency at 600 nm through the substrate with 1 mm thickness is equal to or more than 10%.

With the above substrates 1–6, the crystallization degree of the crystallized glass is equal to or more than 50 vol %.

With the above substrates 6, the total content of enstatite and/or its solid solution may range from 70 to 90 vol %, the content of titanate may range from 10 to 30 vol %, and the sum of enstatite and/or its solid solution and titanate may be equal to or more than 90 vol %.

The present invention relates to a substrate for information recording medium (hereinafter referred to substrate 7) composed of crystallized glass comprising enstatite and/or its solid solution as main crystals and thermal extension coefficient of the crystallized glass is in the range of from $65 \times 10^{-7}$ to $85 \times 10^{-7}/°$ C.

With this substrate 7, the thermal extension coefficient of the crystallized glass is in the range of from $73 \times 10^{-7}$ to $83 \times 10^{-7}/°$ C.

With the above substrates 1–7, the crystallized glass substantially does not comprise quartz solid solution as the main crystals.

With the above substrates 7, the crystallized glass substantially does not comprise spinel as a crystalline phase.

With the above substrates 7, the crystallized glass substantially may not comprise ZnO.

With the above substrates 7, the information recording medium may be a magnetic disk.

The present invention relates to an information recording medium comprising a recording layer on the above-mentioned substrate of the present invention.

With the above information recording medium, the recording layer may be a magnetic recording layer.

The present invention relates to a process for preparation of a substrate for an information recording medium composed of crystallized glass (hereinafter referred to process 1) comprising $SiO_2$: 35–65 mol %
$Al_2O_3$: 5–25 mol %
MgO: 10–40 mol % and
$TiO_2$: 5–15 mol %,
wherein the sum of the above components is equal to or more than 92 mol %, andmain crystals contained in the crystallized glass are enstatite and/or its solid solution;
wherein the above process comprises steps of:
melting glass starting materials at 1400 to 1650° C. to prepare a glass,
molding the resulting glass into a plate-shaped glass, and subjecting the plate-shaped glass to crystallization.

With the above process 1, the glass starting materials may comprise $K_2O$ and the melting temperature is from 1450 to 1600° C., preferably from 1450 to 1550° C.

With the above process 1, the glass starting materials may comprise $Y_2O_3$ and the molding of the glass into a plate shape is conducted with a mold at a temperature of from 600 to 680° C.

The present invention relates to a process for preparation of a substrate for an information recording medium composed of crystallized glass (hereinafter referred to process 2) comprising
$SiO_2$: 35–65 mol %
$Al_2O_3$: 5–25 mol %
MgO: 10–40 mol % and
$TiO_2$: 5–15 mol %,
$Y_2O_3$: 0–10 mol %
$ZrO_2$: 0–10 mol %
$R_2O$: 0–5 mol % (wherein R is at least one selected from the group of Li, Na and K)
RO: 0–5 mol % (wherein R is at least one selected from the group of Ca, Sr and Ba)
$As_2O_3+Sb_2O_3$: 0–2 mol %
$SiO_2+Al_2O_3+MgO+TiO_2$: 92 mol % or more;
and main crystals contained in the crystallized glass are enstatite and/or its solid solution;
wherein the above process comprises steps of:
melting glass starting materials at 1400 to 1650° C. to prepare a glass,
molding the resulting glass into a plate-shaped glass, and subjecting the plate-shaped glass to crystallization.

With the above processes 1–2, the crystallization may be carried out by heating the molded glass to a temperature of from 850 to 1150° C.

With the above processes 1–2, the heating may be carried out by heating the molded glass to a temperature of from 500 to 850° C. at a heating rate of 5 to 50° C./min and then heating the molded glass at a heating rate of 0.1 to 10° C./min.

The present invention further relates to a substrate for an information recording medium composed of crystallized glass (hereinafter referred to substrate 8) comprising
$SiO_2$: 35–65 mol %
$Al_2O_3$: 5–25 mol %
MgO: 10–40 mol % and
$TiO_2$: 5–15 mol %,
wherein the sum of the above components is equal to or more than 92 mol %, main crystals contained in the crystallized glass are enstatite and/or its solid solution, and the crystal glass does not comprise ZnO;
wherein the above crystallized glass is prepared by a process comprising a step of heat-treatment of a glass comprising $SiO_2$, $Al_2O_3$, MgO and $TiO_2$ at a temperature of from 850 to 1150° C. to obtain a crystallized glass.

The present invention further relates to a substrate for an information recording medium (hereinafter referred to substrate 9) composed of crystallized glass substantially consisting of
$SiO_2$: 35–65 mol %
$Al_2O_3$: 5–25 mol %
MgO: 10–40 mol % and
$TiO_2$: 5–15 mol %,
$Y_2O_3$: 0–10 mol %
$ZrO_2$: 0–10 mol %
$R_2O$: 0–5 mol % (wherein R is at least one selected from the group of Li, Na and K)
RO: 0–5 mol % (wherein R is at least one selected from the group of Ca, Sr and Ba)
$As_2O_3+Sb_2O_3$: 0–2 mol %
$SiO_2+Al_2O_3+MgO+TiO_2$: 92 mol % or more;
wherein the above crystallized glass is prepared by a process comprising a step of heat-treatment of a glass comprising $SiO_2$, $Al_2O_3$, MgO and $TiO_2$ at a temperature of from 850 to 1150° C. to obtain a crystallized glass.

With the above substrates 8–9, the heat treatment may be carried out for 1 to 4 hours.

With the above substrates 8–9, the heat-treatment may be carried out at a temperature of from 875 to 1000° C.

BRIEF DESCRIPTION OF THE DRAWING

FIG. 1 shows a schematic sectional view of a magnetic disk 1 of the present invention which comprises crystallized glass substrate 2, on which unevenness control layer 3, underlying layer 4, magnetic layer 5, protective layer 6 and lubricating layer 7 are provided in this order.

MODE FOR CARRYING OUT OF THE INVENTION

[Crystallized Glass]

The substrate for information recording medium of the present invention consists of such a crystallized glass as containing 35–65 mol % of $SiO_2$, 5–25 mol % of $Al_2O_3$, 10–40 mol % of MgO and 5–15 mol % of $TiO_2$, wherein the sum of aforementioned composition is at least equal to or higher than 92 mol %, as well as the main crystals are enstatite and/or its solid solution.

Each of the components in the crystallized glass constituting the substrate of the present invention will be explained in the followings. Provided that "%" means "mol %", as long as it is not especially mentioned.

$SiO_2$ is a component of the network structure of glass, in addition, it is also a component of enstatite having a composition of $MgO.SiO_2$ and enstatite solid solution having a composition of (Mg.Al) $SiO_3$ which are the main deposited crystals. Because the melted glass is very unstable in the case of having the content of $SiO_2$ of less than 35%, it is afraid that it cannot be molded at high temperature, in addition, crystals as mentioned above become difficult to deposit. If the content of $SiO_2$ is less than 35%, the chemical durability and heat resistance of residual glass matrix phase tend to deteriorate. On the other hand, if the content of $SiO_2$ exceeds 65%, enstatite becomes difficult to deposit as main crystals and the Young's modulus of glass tends to be lowered rapidly. Therefore, the content of $SiO_2$ ranges from 35 to 65% in view of kinds of the deposited crystals, the deposited amount thereof, chemical durability, heat resistance, molding characteristics and productivity. From the viewpoint that such a crystallized glass can be obtained as having more preferable physical characteristics, the content of $SiO_2$ preferably ranges from 40 to 60%.

It is to be noted that, as described below, the surface smoothness may become inferior a little, however, it may be preferable that the content of $SiO_2$ ranges from 35 to 43% because a crystallized glass having the high Young's modulus equal to or higher than 160 GPa can be obtained by combination with other components.

$Al_2O_3$ is a medium oxide of glass and contributes to improvement of glass surface hardness. However, if the glass content is less than 5%, chemical durability of glass matrix phase is lowered and the strength required to substrate materials tends to be difficult to be obtained. On the other hand, if the content of $Al_2O_3$ exceeds 25%, enstatite as a main component becomes difficult to deposit as well as the glass become difficult to melt due to the high melting temperature. In addition, the glass has a tendency to be easily devitrified and to increase molding difficulty. Accordingly, it is appropriate that the content of $Al_2O_3$ ranges from 5 to 25%, preferably from 7 to 22% in view of melting characteristics, molding characteristics at a high temperature, kinds of deposited crystals of glass and the like.

It is to be noted that, as described below, the surface smoothness may become inferior a little, however, it may be preferable that the content of $Al_2O_3$ ranges from 9 to 20% because a crystallized glass having the high Young's modulus equal to or higher than 160 GPa can be obtained by combination with other components.

MgO is a glass modifying component, in addition, a main component of crystals of enstatite having a composition of $MgO.SiO_2$ and its solid solution. If the content of MgO is less than 10%, crystals as mentioned above are difficult to deposit, having a high devitrifying tendency and a high melting temperature of the glass, as well as the working temperature width of glass molding tends to be narrower. On the other hand, if the content of MgO exceeds 40%, viscosity of glass at a high temperature is rapidly lowered, thereby, it becomes thermally unstable, productivity deteriorates and the Young's modulus and durability tend to be lowered. Then, it is appropriate that the content of MgO ranges from 10 to 40%, preferably from 12 to 35% in view of productivity, chemical durability, high temperature viscosity and strength of glass.

It is to be noted that, as described below, the surface smoothness may become inferior a little, however, it may be preferable that the content of MgO ranges from 30 to 39% because a crystallized glass having the high Young's modulus equal to or higher than 160 GPa can be obtained by combination with other components.

Provided that the contents of MgO and $Al_2O_3$ are adjusted so that the molar ratio of $Al_2O_3$ to $MgO(Al_2O_3/MgO)$ is less than 0.5. Because the Young's modulus of the crystallized glass rapidly lowers if the molar ratio of $Al_2O_3$ to MgO ($Al_2O_3$/MgO) becomes equal to or higher than 0.5. By adjusting the $Al_2O_3$/MgO less than 0.5, such a crystallized glass can be also obtained as having high Young's modulus equal to or higher than 150 GPa. $Al_2O_3$/MgO is preferably less than 0.45. However, if the molar ratio of $Al_2O_3$/MgO is adjusted to excessively low, it is afraid that viscosity of glass at a high temperature tends to be lowered and the crystalline particle becomes large. Therefore, it is appropriate that $Al_2O_3$/MgO ratio is equal to or higher than 0.2, preferably equal to or higher than 0.25.

$TiO_2$ is a nucleation agent for deposition of crystalline phase of enstatite having a composition of $MgO.SiO_2$ and enstatite solid solution having a composition of (Mg.Al)$SiO_3$. Moreover, if the content of $SiO_2$ is relatively small, $TiO_2$ also has an effect of suppressing glass devitrification. However, if the content of $TiO_2$ is less than 5%, the effect as the nucleation agent for the main crystals cannot be obtained sufficiently, thereby, crystallization causes at the surface of the glass and it tends to be difficult to produce homogenous crystallized glass. On the other hand, if the content of $TiO_2$ exceeds 15%, phase separating and devitrification of the glass occur due to excessively low glass viscosity at a high temperature, so that glass productivity tends to extremely deteriorate. Therefore, it is appropriate that the content of $TiO_2$ ranges from 5 to 15%, preferably from 5.5 to 14% More preferably, it ranges from 8 to 14%.

It is to be noted that, as described below, it may be preferable that the content of $TiO_2$ ranges from 8.5 to 15% because a crystallized glass having the high Young's modulus equal to or higher than 160 GPa can be obtained by combination with other components if the Young's modulus is emphasized further than the surface roughness.

The crystallized glass of the present invention may contain $Y_2O_3$. However, as seen in the following examples, the Young's modulus of the crystallized glass can be increased to about 10 GPa as well as the temperature of liquid phase can be decreased to about from 50 to 100° C. by introducing, for example, 2% of $Y_2O_3$. That is, characteristics and productivity of glass can be improved remarkably by introducing a little amount of $Y_2O_3$. If the content of $Y_2O_3$ is equal to or higher than 0.3%, aforementioned effect of $Y_2O_3$ can be obtained. The content of $Y_2O_3$ is preferably equal to or higher than 0.5%. However, $Y_2O_3$ has an effect of suppressing the growth of the main crystal contained in the aforementioned glass. Therefore, if the content of $Y_2O_3$ is excessively high, the surface is easily crystallized in the heat-treatment carried out for the purpose of the glass crystallization, so that it tends not to produce a desired crystallized glass. From such viewpoints, it is appropriate that the content of $Y_2O_3$ is equal to or less than 10%. In particular, the content of $Y_2O_3$ is preferably equal to or less than 8%, more preferably equal to or less than 3%.

Moreover, the crystallized glass of the present invention can contain equal to or less than 10% of $ZrO_2$. $ZrO_2$ can play an important role to improvement of glass stability, especially in a glass containing a large amount of MgO. In addition, it also works as a nucleation agent and it contributes, as a helper of $TiO_2$, to make the crystalline particles fine with promoting phase separation of glass during pretreatment. However, if the content of $ZrO_2$ exceeds 10%, it is afraid that melting characteristics at a high temperature and homogeneity of glass deteriorate, so that the amount to be introduced appropriately ranges from 1 to 10%. Moreover, the content of $ZrO_2$ preferably ranges from 0 to 6%, more preferably from 1 to 5% in view of melting characteristics of glass at a high temperature and homogeneity of the crystalline particles.

In the crystallized glass of the present invention, the sum of $SiO_2$, $Al_2O_3$, MgO and $TiO_2$ is equal to or higher than 92% from the viewpoint of characteristics such as the high Young's modulus and keeping homogenous crystalline characteristics. The sum of $SiO_2$, $Al_2O_3$, MgO and $TiO_2$ is preferably equal to or higher than 93%, more preferably equal to or higher than 95%.

If within above range, as components other than said components, it may contain such components as alkali metal oxides $R_2O$ (for example, $Li_2O$, $Na_2O$, $K_2O$ or the like) and/or alkali-earth metal oxides RO (for example, CaO, SrO, BaO or the like) in the range of not deteriorating desirable characteristics of the crystallized glass. Alkali metal oxides and/or alkali-earth metal oxides can be produced from nitrates as glass raw materials. If $Sb_2O_3$ is used as a degassing agent in glass producing, Pt is easily included into glass from a crucible made of Pt for glass melting. By using nitrates as glass raw materials, inclusion of Pt into glass can be suppressed. It is preferable that the content of alkali metal oxides and alkali-earth metal oxides is respectively equal to or higher than 0.1% from the viewpoint of obtaining said effect. However, if containing alkali metal oxides, its content is appropriately equal to or less than 5% because alkali metal oxides tend to lower the Young's modulus. On the other hand, alkali metal oxides have such effects as lowering a melting temperature of glass and melting the Pt contamination from a melting crucible made of Pt by ionizing it. In this case, it is also preferably to add them equal to or higher than 0.1% in order to enjoy these effects. Especially, $K_2O$ is preferable because it has an effect to suppress the reduction of the Young's modulus, as well as effects of lowering a melting temperature of glass and melting the Pt contamination from a melting crucible made of Pt by ionizing it. In the case of containing $K_2O$, its content is appropriately equal to or less than 5%, preferably from 0.1 to 2%, more preferably from 0.1 to 1%

In addition, in the case of containing alkali-earth metal oxides, the content of the alkali-earth metal oxides is appropriately equal to or less than 5% because of their tendency to increase crystalline particles. In the case of containing alkali metal oxides, especially, the content of $K_2O$ preferably ranges from 0.1 to 5%, preferably from 0.1 to 2%, more preferably from 0.1 to 1%. In the case of containing alkali-earth metal oxides, especially, the content of SrO ranges from 0.1 to 5%, preferably from 0.1 to 2%. Especially, from the viewpoint of glass stabilization, SrO is preferable and its content ranges from 0.1 to 5%, preferably from 0.1 to 2%.

In addition, $As_2O_3$ and/or $Sb_2O_3$ can be contained as a degassing agent for attempting glass homogenization. According to viscosity at a high temperature changing by the composition of glass, more homogenous glass can be obtained by adding an adequate amount of $As_2O_3$, $Sb_2O_3$ or $As_2O_3+Sb_2O_3$ to glass. However, if excessively large amount of the degassing agent is added, the Young's modulus tends to be lowered by increasing the specific gravity of glass. Moreover, it may react with a platinum crucible for melting, and thereby damaging the crucible. Therefore, it is appropriate that the amount of the degassing agent added is equal to or less than 2%, preferably equal to or less than 1.5%.

Impurities in raw materials, such as Cl, F, $SO_3$ and the like which become a glass cleaning agent, can be contained other than aforementioned basic components if the content is respectively equal to or less than 1% where deterioration of the characteristics of the crystallized glass of the present invention is avoidable.

In addition, it is preferable that the crystallized glass of the present invention substantially does not contain ZnO and NiO. Because ZnO facilitates production of spinel, hard crystals. In addition, not containing NiO is desirable from the viewpoint that NiO facilitates production of spinel, as well as from the viewpoint that NiO is such a component as affecting the environment.

One of the preferred embodiments of the substrate for information recording medium of the present invention is a substrate composed of crystallized glass in which the main crystals are enstatite and/or its solid solution, and comprising 35–65 mol % of $SiO_2$, 5–25 mol % of $Al_2O_3$, 10–40 mol % of MgO, 5–15 mol % of $TiO_2$, 0–10 mol % of $Y_2O_3$, 0–6 mol % of $ZrO_2$, 0–5 mol % of $R_2O$ where R represents at least one selected from the group consisting of Li, Na and K, 0–5 mol % of RO where R represents at least one selected from the group consisting of Ca, Sr and Ba, 0–2 mol % of $As_2O_3+Sb_2O_3$ and equal to or higher than 92 mol % of $SiO_2+Al_2O_3+MgO+TiO_2$.

In the present invention, the main crystals are essential crystals for obtaining effects of the present invention and the crystals contained in the largest amount among crystals in glass. Preferably, the main crystals mean the crystals contained equal to or higher than 50% by volume among crystals in glass. It is to be noted that many crystallized glasses of the present invention contain equal to or higher than 70% by volume of enstatite and/or its solid solution, in some cases, equal to or higher than 80% by volume, in few cases, equal to or higher than 90% by volume. The main crystals in the crystallized glass of the present invention are, for example, enstatite (including enstatite solid solution) having a composition of $MgO.SiO_2$ and $(Mg.Al)SiO_3$. In addition, if the crystallized glass of the present invention contains both of enstatite and its solid solution, a group of enstatite and its solid solution is referred to as main crystals. It is to be noted that enstatite includes clino-enstatite, proto-enstatite and enstatite. Moreover, titanates can be included other than aforementioned crystals. Examples of crystalline phase include a phase in which the sum of enstatite and/or its solid solution ranges from 50 to 100% by volume of and titanates ranges from 50 to 0% by volume. In addition, a phase can be exemplified in which the sum of enstatite and/or its solid solution ranges from 70 to 90% by volume of and titanates ranges from 30 to 10% by volume. In this case, the total amount of enstatite and/or its solid solution and titanates is preferably equal to or higher than 90% by volume, more preferably equal to or higher than 95% by volume, the most preferably equal to or higher than 99% by volume in crystals in glass.

As crystals other than enstatite and/or its solid solution as well as titanates, mullite, forsterite, cordierite, quartz, solid solution of quartz and the like can be exemplified. However, spinel is not included. Enstatite has such characteristics as the crystallized glass containing enstatite as main crystals can be polished very easily due to low hardness (where the Mohs' scale of hardness is 5.5), and it can obtain desirable surface roughness in relatively short time. Moreover, it can be considered that enstatite can provide a glass with high Young's modulus even if the particle size is small because glass components easily penetrate into its voids due to the crystal structure of chain or layer. On the other hand, it is considered that because spinel is harder (where the Mohs' scale of hardness is 8) than enstatite, it makes glass hard to be polished. It is preferable that the crystallized glass of the present invention does not contain quartz solid solution.

In addition, the ratio of crystals in glass (degree of crystallinity) ranges from about 20 to 70% by volume. The degree of crystallinity is preferably equal to or higher than 50% by volume in order to obtain such a substrate as having high Young'modulus. However, in order to make processes after crystallization easy, the degree of crystallinity may range from 20 to 50% by volume, moreover, from 20 to 30% by volume. Alternatively, when it is desirable to obtain high Young's modulus rather than facilitation of processes after crystallization, the degree of crystallinity may range from 50 to 70% by volume.

Moreover, the average value of size of crystals contained in the crystallized glass of the present invention (particle diameter) is preferably equal to or less than 100 nm, more preferably equal to or less than 50 nm, further preferably equal to or less than 30 nm. If the average value of crystalline size exceeds 100 nm, not only lowering the mechanical strength of glass but also the loss of crystals during polishing process causes, thereby it is afraid that the surface roughness of glass deteriorates. Such a control of crystalline size can be done mainly by changing kinds of contained crystalline phase and heat treatment conditions mentioned below. In the present invention, it is possible to obtain such micro crystalline size under the heat treatment conditions under which the main crystals of enstatite and/or its solid solution which are essential components in the present invention can be obtained.

In addition, the crystallized glass constituting the substrate of the present invention may have the thermal expansion coefficient ranging from $65\times10^{-7}$ to $85\times10^{-7}/°$ C., further from $73\times10^{-7}$ to $83\times10^{-7}/°$ C. The thermal expansion coefficient can be set within the above range in view of characteristics required as a substrate for information recording medium.

[Production Method for Crystallized Glass and Substrate]

The substrate composed of the crystallized glass of the present invention can be produced by publicly known production methods of glass substrate. For example, glass materials of a given composition can be melted by the high temperature melting method, i.e., melted in air or inert gas atmosphere, homogenized by bubbling, addition of degassing agent, stirring or the like and molded into plate glass by well-known press method, down draw method or the like. Then, glass molding products of a desired size and shape can be obtained from the plate glass by processing such as cutting and polishing. The crystallized glass of the present invention can be melted, for example, at a temperature of from 1400 to 1650° C., and includes such glasses as possible to be melted at a temperature of from 1500 to 1650° C., further from 1550 to 1600° C. As men t i one d above, for example, $K_2O$ is preferably introduced as a component for lowering a melting temperature.

The glass molding product thus obtained is subjected to heat treatment method for crystallization. The heat treatment method is not especially limited and it can be selected properly according to the content of crystallization promoting agents, glass transition temperature, crystallization peak temperature or the like. However, many crystalline nuclei are generated by heat treatment at relatively low temperature (for example, (glass transition temperature (Tg)–30° C.) to (Tg+60° C.), especially, Tg to (Tg+60° C.) in the initial stage. The temperature specifically ranges from 700 to 850° C. After that, it is preferable that the crystals are grown by elevating the temperature to from 850 to 1150° C. from the viewpoint of obtaining micro crystals. At this time, after the glass temperature becomes ranging from 500 to 850° C., the elevating rate of temperature more preferably ranges from 0.1 to 10° C./min from the viewpoints of deposition of micro crystal particles and preventing deformation of external form of plate glass. However, the elevating rate of temperature is not especially limited until the glass temperature become ranging from 500 to 850° C., and it can be ranged from 5 to 50° C./min. In addition, in the present invention, the admissible temperature range of heat treatment for producing crystalline nuclei and heat treatment for growth of crystals in which such a crystallized glass as having the same Young's modulus and the same crystalline size or the same crystallization homogeneity can be produces is a temperature width equal to or higher than 30° C., so that production process for crystallization can be controlled easily.

Moreover, in the present invention, such a heat treatment conditions are adjusted to conditions under which enstatite having a composition of $MgO.SiO_2$ and enstatite solid solution having a composition of $(Mg.Al)SiO_3$ are deposited as main crystals. It is to be noted that other crystals such as forsterite, cordierite, titanates and mullite may be deposited other than these main crystals, but the conditions under which enstatite and its solid solution are deposited is adopted. As for such conditions, heat treatment for crystallization is preferably carried out at a temperature ranging from 850 to 1150° C. The heating is preferably carried out at a temperature ranging from 875 to 1050° C. If the heating temperature is lower than 850° C., enstatite and its solid solution are hardly deposited. In addition, if exceeding 1150° C., crystals other than enstatite and its solid solution become easy to deposit. In addition, by setting the temperature from 875 to 1000° C., the particle size of enstatite and/or its solid solution can be made relatively small, for example, equal to or less than 100 nm, preferably equal to or less than 50 nm. The heat treatment time for crystallization is selected properly according to desirable degree of crystallinity and particle diameter of crystals because it affects the degree of crystallinity and the particle diameter of crystals depending on the heat treatment temperature. In the heat treatment at a temperature ranging from 850 to 1150° C., it preferably ranges from 1 to 4 hours.

In addition, the temperature of nuclei producing process before heat treatment for crystallization appropriately ranges from 30° C. lower to 60° C. higher than glass transition temperature (Tg), preferably from 0° C. to 60° C. higher than Tg, more preferably from 10 to 50° C. higher than Tg from the viewpoint of deposition of crystals having small crystalline particle diameter.

The molding product of the crystallized glass after subjected to heat treatment may be polished, if necessary, and polishing method is not especially limited. For example, it can be polished by publicly known methods using synthetic sharpening particle, such as synthetic diamond, silicon carbide, aluminum oxide and boron carbide, and natural sharpening particle, such as natural diamond and cerium oxide. The molded product which has been polished but not be subjected to crystallization can also be subjected to the above-mentioned crystallization.

The substrate for information recording medium composed of the crystallized glass of the present invention preferably has the surface smoothness as having the average roughness Ra (JIS B0601) equal to or less than 1 nm measured with AFM (Atomic Force Microscopy). Especially, in the case of using the crystallized glass of the present invention as a magnetic disk substrate, the average roughness Ra (JIS B0601) of the surface significantly influences recording density of the magnetic disk. If the surface roughness exceeds 1 nm, high recording density is hardly obtained. The surface roughness of the substrate composed of the crystallized glass of the present invention is more preferably equal to or less than 0.7 nm, further preferably equal to or less than 0.5 nm in view of obtaining high recording density.

The substrate composed of the crystallized glass of the present invention in which enstatite and its solid solution are contained as main crystals is useful as a magnetic disk substrate because it has high strength, high hardness and high Young's modulus as well as being excellent in chemical durability and heat resistance. Moreover, the crystallized glass of the present invention is alkali free or low-alkali, so that if used as a magnetic disk substrate, corrosion of a magnetic film with the substrate is greatly decreased, thereby the magnetic film can be kept in the best condition.

The crystallized glass of the present invention is $SiO_2$—$Al_2O_3$—$MgO$ based glass in which the main crystals are enstatite and/or its solid solution, as mentioned above. Other than this, the present invention includes the crystallized glass substrates for information recording medium which are glasses other than $SiO_2$—$Al_2O_3$—$MgO$ based glass and in which the main crystals are enstatite and/or its solid solution and in which s a polished plane having the surface roughness Ra (JIS B0601) equal to or less than 1 nm is provided. It is to be noted that the main crystals herein are such crystals as contained in an amount equal to or higher than 50% by volume among crystals in the glass. In many crystallized glasses, enstatite and/or its solid solution are contained, in an amount equal to or higher than 70% by volume, in some cases, equal to or higher than 80% by volume, in few cases, equal to or higher than 90% by volume of whole the crystals. In addition, in this crystallized glass (crystallinity), the ratio of crystals in glass ranges about from 20 to 70%.

In the crystallized glass substrate in this embodiment, the average value of the size (particle diameter) of the crystals contained in the crystallized glass is preferably equal to or less than 0.5 μm, more preferably equal to or less than 0.3 μm, further preferably equal to or less than 0.1 μm. The average value of the size of the crystals contained in the crystallized glass is the most preferably equal to or less than 50 nm. If the average value of the crystalline size exceeds 0.5 μm, it is afraid that not only lowering the mechanical strength of the glass but also the loss of crystals during polishing process causes, thereby the glass surface roughness deteriorates. Such a control of the size of crystal particles is carried out mainly by selecting kinds of the contained crystalline phase and heat treatment condition mentioned below. However, in the present invention, it is possible to obtain the micro particle size as mentioned above in the heat treatment conditions under which the main crystals of enstatite and/or its solid solution which are essential in the present invention are obtained.

Small crystal size results in an increase of light transparency at 600 nm through the substrate with 1 mm thickness. The substrate of the present invention exhibits the transparency equal to or more than 10%, or equal to or more than 50%, in some cases, from 60% to 90%.

The crystallized glass substrate in this embodiment preferably has a Young's modulus equal to or higher than 140 GPa as the substrate use for rotation at a high speed. In addition, it is preferable that the crystallized glass substrate of the present invention substantially does not contain quartz solid solution as main crystals. Moreover, it is preferable that the crystallized glass substrate of the present invention substantially does not contain spinel as a crystalline phase. Because spinel is hard crystals compared with enstatite (having the Mohs' scale of hardness of 8), it is difficult to be polished and the polished plane having a surface roughness Ra (JIS B0601) equal to or less than 1 nm is hardly obtained.

Demands for high Young's modulus can be explained on the basis of the following fact. That is, with recent smaller size, higher capacity and higher speed of HDDs, it is expected that the thickness of 3.5-inch disks currently used of 0.8 mm will be made smaller to 0.635 mm, and 0.635 mm of current 2.5-inch disks to 0.43 mm, or even to 0.38 mm. Revolution speed of substrates is also expected to be made faster from the current maximum speed of 7,200 rpm to 10,000 rpm, or even to 14,000 rpm. As substrates for such magnetic recording media become thinner, they become more likely to suffer deflexion, undulation and warp, and it is expected that, as the revolution speed becomes higher, stress loaded on the substrates (force exerted by wind pressure caused by rotation of disks) will become larger. Based on the theory of dynamics, the deflexion W of a disk receiving load of P per unit area is represented by the following formula:

$$W \propto \frac{Pa^4}{h^3 E}$$

wherein a represents an outer diameter of disk, h represents a thickness of substrate and E represents Young's modulus of disk material.

In static state, force loaded on the disk is the gravitation alone is, and the deflexion W is represented by the following formula:

$$W \propto \frac{hda^4}{h^3 E} = \frac{da^4}{h^2 E} = \frac{a^4}{h^2 G}$$

wherein d represents a specific gravity of disk material and G is a specific elastic modulus of disk material (=Young's modulus/specific gravity).

On the other hand, supposing that the gravitational force is balanced by centrifugal force and can be ignored in rotating state of disk, force loaded on the disk may be considered only wind pressure caused by the rotation of the disk. The wind pressure is represented as a function of disk revolution speed and said to be proportional to the second power of the speed. Accordingly, the deflexion W when the disk is rotating is represented by the following formula:

$$w \propto \frac{(rpm)^2 a^4}{h^3 E}$$

From these results, in order to suppress the deflexion W of substrate to be rotated at a high speed, a material of high Young's modulus E is required. According to the present inventors' calculation, when the thickness of 2.5-inch substrate is made smaller from 0.635 mm to 0.43 mm, and the thickness of 3.5-inch substrate from 0.8 mm to 0.635 mm, it is required that the specific elastic modulus of substrate materials is at least equal to or higher than 37 MNm/kg. In addition, when the current revolution speed of 3.5-inch high-end substrates of 7200 rpm is made faster to prospective 10000 rpm, an aluminum substrate having Young's modulus of around 70 GPa cannot meet such a high speed, and new substrate materials having the Young's modulus at least equal to or higher than GPa are required. As the specific elastic modulus or Young's modulus of substrate material becomes higher, not only stiffness of substrates becomes higher, but also impact resistance and strength of substrates become higher. Therefore, a glass material having high specific elastic modulus and high Young's modulus is strongly desired in the field of HDD production.

In the present invention, such a substrate has high Young's modulus equal to or higher than 160 GPa, as comprising 35 to 43 mol % of $SiO_2$, 9 to 20 mol % of $Al_2O_3$, 30 to 39 mol % of MgO, 1 to 3 mol % of $Y_2O_3$, 8.5 to 15 mol % of $TiO_2$ and 1 to 5 mol % of $ZrO_2$. In this case, the molar ratio of $SiO_2$/MgO is appropriately equal to or less than 1.35.

The magnetic disk substrate composed of the crystallized glass of the present invention can satisfy all characteristics required as a magnetic disk substrate, such as surface smoothness, flatness, strength, hardness, chemical durability and heat resistance. In addition, the Young's modulus is about twice larger than the conventional crystallized glass ($Li_2O$—$SiO_2$ based crystallized glass), so that it is possible to suppress the deflexion caused by high revolution speed of the disk low, thereby it is suitable as a substrate material to achieve high TPI hard disks.

Because the crystallized glass of the present invention is excellent in heat resistance, surface smoothness, chemical durability, optical characteristics and mechanical strength, it can be used suitable as substrates for information recording medium such as magnetic disks, glass substrates for optical magnetic disks and electron optical glass substrates such as optical disks.

[Explanation of Magnetic Disk]

The information recording medium of the present invention is characterized by having the substrate of the present invention and a recording layer formed on said substrate. A magnetic disk (hard disk) comprising a substrate composed of the crystallized glass of the present invention described above and at least a magnetic layer formed on a main surface of the substrate will be explained hereinafter. As layers other than the magnetic layer, underlying layer, protective layer, lubricating layer, unevenness control layer and the like are optionally formed depending on functions of the disk. These layers can be formed by various thin film-forming techniques.

Material for the magnetic layer is not particularly limited. For example, in addition to Co magnetic layers, ferrite magnetic layers, iron-rare earth metal magnetic layers and the like can be mentioned. The magnetic layer may be either for horizontal magnetic recording or vertical magnetic recording. Specific examples of the magnetic layer include, for example, those containing Co as a main component such as CoPt, CoCr, CoNi, CoNiCr, CoCrTa and CoPtCr, and CoNiCrPt, CoNiCrTa, CoCrPtTa, CoCrPtSiO and the like. The magnetic layer may be consisted of multiple layers comprising a non-magnetic layer for noise reduction separating magnetic layers. The underlying layer of the magnetic layer may be selected depending on the nature of the magnetic layer. For example, the underlying layer may be those comprising one or more of non-magnetic metals such as Cr, Mo, Ta, Ti, W, V, B and Al, or oxides, nitride, carbides and the like of those metals. For a magnetic layer comprising Co as the main component, an underlying layer of pure Cr or Cr alloy is preferred for improving magnetic characteristics. The underlying layer is not limited to a monolayer, and may be composed of multiple layers consisting of multiple identical or different layers. For example, the underlying layer may be a multi-layer underlying layer such as Al/Cr/CrMo and Al/Cr/Cr.

The unevenness control layer for preventing absorption of magnetic disk to magnetic head may be provided between the substrate and the magnetic layer or on the magnetic layer. Because surface roughness of the disk is properly controlled by the unevenness control layer, the magnetic disk is prevented from being absorbed to the magnetic disk and hence a highly reliable magnetic disk can be provided. Various materials and production methods for the unevenness control layer have been known and they are not particularly limited. For example, the material of the unevenness control layer may be one or more metals selected from Al, Ag, Ti, Nb, Ta, Bi, Si, Zr, Cr, Cu, Au, Sn, Pd, Sb, Ge, Mg and the like, alloys thereof, oxides, nitrides, carbides thereof and the like. For the ease of production, those produced from metals containing Al as a main component such as pure Al, Al alloys, Al oxides and Al nitrides are preferred.

In addition, for good head stiction, surface roughness of the unevenness forming layer is preferably $R_{max}$ of 50–300 Å, more preferably $R_{max}$ of 100–200 Å. When the $R_{max}$ is less than 50 Å, the disk surface is nearly flat, and hence the magnetic head and the disk are absorbed to each other. This may disadvantageously cause damage of the magnetic head and the magnetic disk, and head crash. On the other hand, when the $R_{max}$ exceeds 300 Å, glide height becomes larger and recording density is disadvantageously lowered.

It is to be noted that unevenness may be provided on the surface of the glass substrate by a texturing treatment such as etching treatment and irradiation of laser lights instead of providing the unevenness control layer.

The protective layer may be, for example, Cr layer, Cr alloy layer, carbon layer, zirconia layer, silica layer or the like. These protective layers can be successively formed by an inline sputtering apparatus together with the underlying layer, the magnetic layer and the like. These protective layers may have either monolayer structure or multilayer structure comprising identical or different layers.

Another protective layer may be provided on or instead of the protective layer explained above. For example, a silicon oxide ($SiO_2$) layer may be formed on the protective layer mentioned above by applying tetraalkoxysilane diluted in an alcoholic solvent, in which colloidal silica is further dispersed, and sintering the applied layer. This layer functions as a protective layer and as an unevenness control layer.

While various kinds of layers have been proposed as the lubricating layer, it is generally formed by applying a liquid lubricating agent, perfluoropolyether, diluted in a solvent such as freons by dipping, spin coating, spraying or the like and subjecting the coated layer to a heat-treatment as required.

EXAMPLES

The details of the present invention will be explained in the following examples, however, the present invention is not limited to these examples.

In Tables 1 to 12, the glass compositions of Examples 1 to 42 are listed with respect to mol % (or % by weight). The compositions shown in Tables 1 to 12 are those of the starting materials. However, as the results of analysis on the crystallized glass of Examples 1 to 15, the compositional difference between the starting material and the crystallized glass is within ±0.1%. Thus, the compositions of the starting materials shown in Tables 1 to 12 are substantially identical with these of the crystallized glasses. As the starting materials of these glasses, $SiO_2$, $Al_2O_3$, $Al(OH)_3$, MgO, $Y_2O_3$, $TiO_2$, $ZrO_2$, $KNO_3$, $Sr(NO_3)_2$, $Sb_2O_3$ and the like were weighed into 250–300 g portions according to the given compositions shown in Tables 1 to 12 and mixed sufficiently to provide formulated batches. Provided that, not shown in the tables, all of the glasses contain 0.03 mol % of $Sb_2O_3$. Each of them was charged in a platinum crucible and melted in air for 4 to 5 hours at 1550° C. with stirring. After melting, the glass melting liquid was cast into a carbon mold having a size of 180×15×25 mm, left to cool to the glass transition temperature, immediately transferred into an annealing furnace, annealed in the glass transition temperature range for about 1 hour and left to cool to room temperature in the furnace. The resulting glasses did not contain deposited crystals which can be observed by a microscope. After glass pieces having a size of 180×15×25 mm were polished into pieces having a size of 100×10×10 mm or 10×10×20 mm, they were put in a heat treatment furnace, elevating a temperature at an elevating speed of temperature of from 1 to 5° C./min up to the temperature of heat treatment for crystal nucleus production described in Tables 1 to 12, and immediately after finishing the heat treatment for crystal nucleus production, elevating a temperature at an elevating speed of temperature of from 2 to 10° C./min. from the temperature of heat treatment for crystal nucleus production to the temperature of heat treatment for crystallization described in Tables 1 to 12. After keeping the temperature for 1 to 5 hours, the crystallized glass was produced by cooling to the room temperature in the furnace. The crystallized glass thus obtained was further polished as to have the length of 95 mm, and then used as a sample for measuring the Young's modulus and the specific gravity. The data obtained by the measurements are listed together with the glass compositions in Tables 1 to 12.

For comparison, the ion-exchanged glass substrate disclosed in Japanese Patent Unexamined Publication No.Hei.1-239036 (JP-A-239036/89) and the glass substrate disclosed in U.S. Pat. No. 2,516,553 were utilized as Comparative examples 1 and 2 and their compositions and characteristics are shown in Table 13.

TABLE 1

| Composition (mol %) | 1 | 2 | 3 |
|---|---|---|---|
| $SiO_2$ | 48.00 | 47.00 | 47.00 |
| $Al_2O_3$ | 11.00 | 10.50 | 10.50 |
| MgO | 30.00 | 30.00 | 28.50 |
| $Y_2O_3$ | 1.00 | 0.50 | |
| $ZrO_2$ | | 2.00 | 2.00 |
| $TiO_2$ | 10.00 | 10.00 | 10.00 |
| $Al_2O_3$/MgO | 0.37 | 0.35 | 0.37 |
| $SiO_2$/MgO | 1.60 | 1.56 | 1.65 |
| S + A + M + T | 99 | 97.5 | 96 |
| Transition temperature Tg (° C.) | 732 | 735 | 729 |
| Heat treatment temperature of producing crystal nucleus (° C.) | Tg + 28 | Tg + 35 | Tg + 31 |
| Heat treatment time of producing crystal nucleus (h) | 4 | 4 | 4 |
| Elevating speed of temperature (° C./h)* | 300 | 300 | 300 |
| Heat treatment temperature of crystallization (° C.) | 1000 | 1000 | 1000 |
| Heat treatment time of crystallization (h) | 4 | 4 | 4 |
| Elevating speed of temperature (° C./h)** | 240 | 240 | 240 |
| Kind of fracture surface | Glass | Glass | Glass |
| Transparency at a wavelength of 600 nm | 75% | 73% | 78% |
| Specific gravity (g/cm³) | 3.086 | 3.14 | 3.11 |
| Young's modulus (GPa) | 148.5 | 150.5 | 147 |
| Poisson ratio | 0.231 | 0.23 | 0.229 |
| Kind of main crystals | Enstatite | Enstatite | Enstatite |
| Kind of other crystals | Titanate | Titanate | Titanate |

TABLE 1-continued

| Composition (mol %) | 1 | 2 | 3 |
|---|---|---|---|
| Specific modulus of elasticity (MNm/kg) | 48.1 | 47.9 | 47.3 |
| Thermal expansion coefficient ($10^{-7}$/° C.) | 72 | 72 | 75 |
| Average particle diameter (nm) | 30~40 | 30~40 | 40~50 |
| Ra (nm) | 0.3 | 0.3 | 0.3 |

Enstatite:Enstatite and its solid solution
S + A + M + T = $SiO_2$ + $Al_2O_3$ + MgO + $TiO_2$
*Elevating speed of temperature in the process of elevating temperature up to heat treatment temperature of producing crystal nucleus
**Elevating speed of temperature in the process of elevating temperature from heat treatment temperature of producing crystal nucleus to crystallization heat treatment temperature

TABLE 2

| Composition (mol %) | 4 | 5 | 6 |
|---|---|---|---|
| $SiO_2$ | 46.00 | 47.00 | 41.00 |
| $Al_2O_3$ | 10.50 | 12.50 | 12.50 |
| MgO | 31.00 | 28.50 | 34.50 |
| $Y_2O_3$ | 0.50 | 2.00 | 2.00 |
| $ZrO_2$ | 2.00 | | |
| $TiO_2$ | 10.00 | 10.00 | 10.00 |
| $Al_2O_3$/MgO | 0.34 | 0.44 | 0.36 |
| $SiO_2$/MgO | 1.48 | 1.65 | 1.18 |
| S + A + M + T | 97.5 | 98 | 98 |
| Transition temperature Tg (° C.) | 732 | 729 | 738 |
| Heat treatment temperature of producing crystal nucleus (° C.) | Tg + 38 | Tg + 31 | Tg + 22 |
| Heat treatment time of producing crystal nucleus (h) | 4 | 4 | 4 |
| Elevating speed of temperature (° C./h)* | 300 | 300 | 300 |
| Heat treatment temperature of crystallization (° C.) | 1000 | 1000 | 1000 |
| Heat treatment time of crystallization (h) | 4 | 4 | 4 |
| Elevating speed of temperature (° C./h)** | 240 | 240 | 240 |
| Kind of fracture surface | Glass | Glass | Glass |
| Transparency at a wavelength of 600 nm | 79% | 76% | 75% |
| Specific gravity (g/cm³) | 3.158 | 3.038 | 3.309 |
| Young's modulus (GPa) | 153.2 | 146.7 | 179.1 |
| Poisson ratio | 0.23 | 0.225 | 0.245 |
| Kind of main crystals | Enstatite | Enstatite | Enstatite |
| Kind of other crystals | Titanate | Titanate | Titanate |
| Specific modulus of elasticity (MNm/kg) | 48.5 | 48.3 | 54.1 |
| Thermal expansion coefficient ($10^{-7}$/° C.) | 74 | 70 | 83 |
| Average particle diameter (nm) | 20~30 | 50~70 | 100~150 |
| Ra (nm) | 0.25 | 0.4 | 0.5 |

Enstatite:Enstatite and its solid solution
S + A + M + T = $SiO_2$ + $Al_2O_3$ + MgO + $TiO_2$
*Elevating speed of temperature in the process of elevating temperature up to heat treatment temperature of producing crystal nucleus
**Elevating speed of temperature in the process of elevating temperature from heat treatment temperature of producing crystal nucleus to crystallization heat treatment temperature

TABLE 3

| Composition (mol %) | 7 | 8 | 9 | 10 |
|---|---|---|---|---|
| $SiO_2$ | 43.00 | 45.00 | 47.00 | 49.00 |
| $Al_2O_3$ | 12.50 | 12.50 | 12.50 | 10.50 |
| MgO | 32.50 | 30.50 | 28.50 | 29.50 |
| $Y_2O_3$ | 2.00 | 2.00 | 2.00 | 1.00 |
| $ZrO_2$ | | | | |
| $TiO_2$ | 10.00 | 10.00 | 10.00 | 10.00 |
| $Al_2O_3$/MgO | 0.38 | 0.41 | 0.44 | 0.35 |
| $SiO_2$/MgO | 1.32 | 1.47 | 1.65 | 1.66 |
| S + A + M + T | 98 | 98 | 98 | 99 |
| Transition temperature Tg (° C.) | 740 | 739 | 740 | 732 |
| Heat treatment temperature of producing crystal nucleus (° C.) | Tg + 30 | Tg + 31 | Tg + 20 | Tg + 28 |
| Heat treatment time of producing crystal nucleus (h) | 4 | 4 | 4 | 4 |
| Elevating speed of temperature (° C./h)* | 300 | 300 | 300 | 300 |
| Heat treatment temperature of crystallization (° C.) | 1000 | 1000 | 1000 | 1000 |
| Heat treatment time of crystallization (h) | 4 | 4 | 4 | 4 |
| Elevating speed of temperature (° C./h)** | 240 | 240 | 240 | 240 |
| Kind of fracture surface | Glass | Glass | Glass | Glass |
| Transparency at a wavelength of 600 nm | 73% | 78% | 79% | 76% |
| Specific gravity (g/cm³) | 3.254 | 3.207 | 3.168 | 3.068 |
| Young's modulus (GPa) | 170 | 163.4 | 157.3 | 149.1 |
| Poisson ratio | 0.245 | 0.241 | 0.237 | 0.228 |
| Kind of main crystals | Enstatite | Enstatite | Enstatite | Enstatite |
| Kind of other crystals | Titanate | Titanate | Titanate | Titanate |
| Specific modulus of elasticity (MNm/kg) | 52.2 | 51.0 | 49.7 | 48.6 |
| Thermal expansion coefficient ($10^{-7}$/° C.) | 81 | 76 | 72 | 77 |
| Average particle diameter (nm) | 80~120 | 50~70 | 50~70 | 40~50 |

Enstatite:Enstatite and its solid solution
S + A + M + T = $SiO_2$ + $Al_2O_3$ + MgO + $TiO_2$
*Elevating speed of temperature in the process of elevating temperature up to heat treatment temperature of producing crystal nucleus
**Elevating speed of temperature in the process of elevating temperature from heat treatment temperature of producing crystal nucleus to crystallization heat treatment temperature

TABLE 4

| Composition (mol %) | 11 | 12 | 13 |
|---|---|---|---|
| $SiO_2$ | 46.00 | 46.00 | 46.00 |
| $Al_2O_3$ | 10.50 | 10.50 | 10.50 |
| MgO | 30.50 | 30.00 | 30.00 |
| $K_2O$ | 0.50 | | |
| SrO | | 1.00 | 1.50 |
| $Y_2O_3$ | 0.50 | 0.50 | |
| $ZrO_2$ | 2.00 | 2.00 | 2.00 |
| $TiO_2$ | 10.00 | 10.00 | 9.00 |
| $Al_2O_3$/MgO | 0.34 | 0.35 | 0.35 |
| $SiO_2$/MgO | 1.51 | 1.53 | 1.53 |
| S + A + M + T | 97 | 96.5 | 95.5 |
| Transition temperature Tg (° C.) | 726 | 728 | 726 |
| Heat treatment temperature of producing crystal nucleus (° C.) | Tg + 30 | Tg + 30 | Tg + 30 |
| Heat treatment time of producing crystal nucleus (h) | 4 | 4 | 4 |
| Elevating speed of temperature (° C./h)* | 300 | 300 | 300 |
| Heat treatment temperature of crystallization (° C.) | 1000 | 1000 | 1000 |
| Heat treatment time of crystallization (h) | 4 | 4 | 4 |
| Elevating speed of temperature (° C./h)** | 240 | 240 | 240 |
| Kind of fracture surface | Glass | Glass | Glass |
| Transparency at a wavelength of 600 nm | 82% | 70% | 67% |
| Specific gravity (g/cm³) | 3.127 | 3.172 | 3.175 |
| Young's modulus (GPa) | 149.2 | 151.8 | 152.1 |
| Poisson ratio | 0.232 | 0.234 | 0.234 |
| Kind of main crystals | Enstatite | Enstatite | Enstatite |
| Kind of other crystals | Titanate | Titanate | Titanate |
| Specific modulus of elasticity (MNm/kg) | 47.7 | 47.9 | 47.9 |
| Thermal expansion coefficient ($10^{-7}$/° C.) | 77.9 | 75.1 | 74.7 |

TABLE 4-continued

| Composition (mol %) | 11 | 12 | 13 |
|---|---|---|---|
| Average particle diameter (nm) | 20~30 | 30~50 | 30~50 |
| Ra (nm) | 0.20 | 0.30 | 0.30 |

Enstatite:Enstatite and its solid solution
S + A + M + T = $SiO_2$ + $Al_2O_3$ + MgO + $TiO_2$
*Elevating speed of temperature in the process of elevating temperature up to heat treatment temperature of producing crystal nucleus
**Elevating speed of temperature in the process of elevating temperature from heat treatment temperature of producing crystal nucleus to crystallization heat treatment temperature

TABLE 5

| Composition (mol %) | 14 | 15 | 16 |
|---|---|---|---|
| $SiO_2$ | 46.00 | 46.00 | 46.00 |
| $Al_2O_3$ | 10.50 | 10.50 | 10.50 |
| MgO | 31.00 | 30.00 | 31.0 |
| $K_2O$ | | 0.50 | 0.50 |
| SrO | 1.00 | 0.50 | |
| $Y_2O_3$ | 0.50 | 0.50 | 0.50 |
| $ZrO_2$ | 2.00 | 2.00 | 2.00 |
| $TiO_2$ | 9.00 | 10.00 | 9.50 |
| $Al_2O_3$/MgO | 0.34 | 0.34 | 0.34 |
| $SiO_2$/MgO | 1.48 | 1.53 | 1.48 |
| S + A + M + T | 96.5 | 96.5 | 97 |
| Transition temperature Tg (° C.) | 725 | 727 | 734 |
| Heat treatment temperature of producing crystal nucleus (° C.) | Tg + 30 | Tg + 30 | Tg + 26 |

TABLE 5-continued

| Composition (mol %) | 14 | 15 | 16 |
|---|---|---|---|
| Heat treatment time of producing crystal nucleus (h) | 4 | 4 | 4 |
| Elevating speed of temperature (° C./h)* | 300 | 300 | 300 |
| Heat treatment temperature of crystallization (° C.) | 1000 | 1000 | 1000 |
| Heat treatment time of crystallization (h) | 4 | 4 | 4 |
| Elevating speed of temperature (° C./h)** | 240 | 240 | 240 |
| Kind of fracture surface | Glass | Glass | Glass |
| Transparency at a wavelength of 600 nm | 80% | 80% | 78% |
| Specific gravity (g/cm³) | 3.124 | 3.15 | 3.139 |
| Young's modulus (GPa) | 147.1 | 148.2 | 149.5 |
| Poisson ratio | 0.231 | 0.232 | 0.229 |
| Kind of main crystals | Enstatite | Enstatite | Enstatite |
| Kind of other crystals | Titanate | Titanate | Titanate |
| Specific modulus of elasticity (MNm/kg) | 47.1 | 47.0 | 47.6 |
| Thermal expansion coefficient ($10^{-7}$/° C.) | 79.2 | 78.1 | 75 |
| Average particle diameter (nm) | 20~30 | 20~30 | 20~30 |
| Ra (nm) | 0.30 | 0.25 | 0.20 |

Enstatite:Enstatite and its solid solution
S + A + M + T = $SiO_2$ + $Al_2O_3$ + MgO + $TiO_2$
*Elevating speed of temperature in the process of elevating temperature up to heat treatment temperature of producing crystal nucleus
**Elevating speed of temperature in the process of elevating temperature from heat treatment temperature of producing crystal nucleus to crystallization heat treatment temperature

TABLE 6

| Composition (mol %) | 17 | | 18 | | 19 | | 20 | |
|---|---|---|---|---|---|---|---|---|
| | mol % | wt % | mol % | wt % | mol % | wt % | mol % | wt % |
| $SiO_2$ | 39.00 | 35.57 | 39.00 | 35.13 | 39.00 | 36.07 | 39.00 | 34.76 |
| $Al_2O_3$ | 12.50 | 19.35 | 12.50 | 19.11 | 11.00 | 17.27 | 14.00 | 19.41 |
| MgO | 33.50 | 20.49 | 32.50 | 19.63 | 35.00 | 21.72 | 32.00 | 21.17 |
| $Y_2O_3$ | 2.00 | 6.86 | 2.00 | 6.77 | 2.00 | 6.95 | 2.00 | 6.88 |
| $TiO_2$ | 10.00 | 12.13 | 10.00 | 11.98 | 10.00 | 12.30 | 10.00 | 12.16 |
| $ZrO_2$ | 3.00 | 5.61 | 4.00 | 7.39 | 3.00 | 5.69 | 3.00 | 5.63 |
| Tg | 743 | | 744 | | 741 | | 746 | |
| $Al_2O_3$/MgO | 0.373 | | 0.385 | | 0.314 | | 0.438 | |
| $SiO_2$/MgO | 1.16 | | 1.2 | | 1.114 | | 1.22 | |
| S + A + M + T | 95 | | 94 | | 95 | | 95 | |
| Transparency at 600 nm (%) | 40 | | 40 | | 48 | | 30 | |
| Average particle (nm) | 120–200 | | 120–200 | | 100–150 | | 200–250 | |
| Ra (nm) | 0.50 | | 0.50 | | 0.40 | | 0.70 | |
| Expansion ($10^{-7}$/° C.) | 78 | | 77 | | 75 | | 74 | |
| Young's modulus (GPa) | 175.00 | | 168.90 | | 177.00 | | 172.90 | |
| Poisson ratio ? | 0.250 | | 0.251 | | 0.250 | | 0.251 | |
| Specific gravity (g/cm³) | 3.401 | | 3.389 | | 3.425 | | 3.349 | |
| Specific modulus of elasticity (MNm/kg) | 51.5 | | 49.8 | | 51.7 | | 51.6 | |
| Tn | 790° C./4 h | | 790° C./4 h | | 790° C./4 h | | 790° C./4 h | |
| Elevating speed of temperature* | 5° C./min | | 5° C./min | | 5° C./min | | 5° C./min | |
| Tc | 1000° C./4 h | | 1000° C./4 h | | 1000° C./4 h | | 1000° C./4 h | |
| Elevating speed of temperature** | 5° C./min | | 5° C./min | | 5° C./min | | 5° C./min | |

TABLE 6-continued

|  | 17 | | 18 | | 19 | | 20 | |
|---|---|---|---|---|---|---|---|---|
| Composition (mol %) | mol % | wt % | mol % | wt % | mol % | wt % | mol % | wt % |
| State of crystallization | Good | | Good | | Good | | Good | |
| Kind of main crystals | Enstatite | | Enstatite | | Enstatite | | Enstatite | |
| Kind of other crystals | Titanate | | Titanate | | Titanate | | Titanate | |

Enstatite:Enstatite and its solid solution
S + A + M + T = $SiO_2$ + $Al_2O_3$ + MgO + $TiO_2$
*Elevating speed of temperature in the process of elevating temperature up to heat treatment temperature of producing crystal nucleus
**Elevating speed of temperature in the process of elevating temperature from heat treatment temperature of producing crystal nucleus to crystallization heat treatment temperature

TABLE 7

|  | 21 | | 22 | | 23 | | 24 | |
|---|---|---|---|---|---|---|---|---|
| Composition (mol %) | mol % | wt % | mol % | wt % | mol % | wt % | mol % | wt % |
| $SiO_2$ | 39.00 | 35.89 | 39.00 | 36.60 | 38.00 | 34.76 | 38.00 | 34.76 |
| $Al_2O_3$ | 12.50 | 19.52 | 12.50 | 19.91 | 12.50 | 19.41 | 12.50 | 19.41 |
| MgO | 35.00 | 21.61 | 34.50 | 21.72 | 34.50 | 21.17 | 34.50 | 21.17 |
| $Y_2O_3$ | 2.00 | 6.92 | 1.00 | 3.53 | 2.00 | 6.88 | 2.00 | 6.88 |
| $TiO_2$ | 8.50 | 10.40 | 10.00 | 12.48 | 10.00 | 12.16 | 10.00 | 12.16 |
| $ZrO_2$ | 3.00 | 5.66 | 3.00 | 5.77 | 3.00 | 5.63 | 3.00 | 5.63 |
| Tg | 750 | | 741 | | 742 | | | |
| $Al_2O_3$/MgO | 0.357 | | 0.362 | | 0.362 | | 0.362 | |
| $SiO_2$/MgO | 1.114 | | 1.13 | | 1.13 | | 1.101 | |
| S + A + M + T | 94.5 | | 96 | | 95 | | 95 | |
| Transparency at 600 nm (%) | 35 | | 40 | | 40 | | 25 | |
| Average particle (nm) | 150–220 | | 120–200 | | 120–200 | | 150–200 | |
| Ra (nm) | 0.70 | | 0.40 | | 0.40 | | 0.65 | |
| Expansion ($10^{-7}$/° C.) | 73 | | 75 | | 74 | | 78 | |
| Young's modulus (GPa) | 175.70 | | 182.50 | | 175.40 | | 188.50 | |
| Poisson ratio ? | 0.256 | | 0.246 | | 0.255 | | 0.245 | |
| Specific gravity (g/cm³) | 3.404 | | 3.381 | | 3.416 | | 3.435 | |
| Specific modulus of elasticity (MNm/kg) | 51.6 | | 54.0 | | 51.3 | | 54.9 | |
| Tn | 790° C./4 h | | 790° C./4 h | | 790° C./4 h | | 790° C./4 h | |
| Elevating speed of temperature* | 5° C./min | | 5° C./min | | 5° C./min | | 5° C./min | |
| Tc | 1000° C./4 h | | 1000° C./4 h | | 1000° C./4 h | | 1000° C./4 h | |
| Elevating speed of temperature** | 5° C./min | | 5° C./min | | 5° C./min | | 5° C./min | |
| State of crystallization | Good | | Good | | Good | | Good | |
| Kind of main crystals | Enstatite | | Enstatite | | Enstatite | | Enstatite | |
| Kind of other crystals | Titanate | | Titanate | | Titanate | | Titanate | |

Enstatite:Enstatite and its solid solution
S + A + M + T = $SiO_2$ + $Al_2O_3$ + MgO + $TiO_2$
*Elevating speed of temperature in the process of elevating temperature up to heat treatment temperature of producing crystal nucleus
**Elevating speed of temperature in the process of elevating temperature from heat treatment temperature of producing crystal nucleus to crystallization heat treatment temperature

TABLE 8

| Composition (mol %) | 25 | 26 | 27 | 28 |
|---|---|---|---|---|
| $SiO_2$ | 58.00 | 55.00 | 47.00 | 48.00 |
| $Al_2O_3$ | 11.00 | 10.50 | 20.00 | 15.00 |
| MgO | 20.00 | 24.00 | 22.50 | 25.50 |
| $K_2O$ | | | | |
| SrO | | | | |
| $Y_2O_3$ | | 0.50 | 0.50 | 0.50 |

TABLE 8-continued

| Composition (mol %) | 25 | 26 | 27 | 28 |
|---|---|---|---|---|
| $ZrO_2$ | 1.00 | | | 1.00 |
| $TiO_2$ | 10.00 | 10.00 | 10.00 | 10.00 |
| $Al_2O_3$/MgO | | | | |
| $SiO_2$/MgO | 2.9 | 2.29 | 2.09 | 1.88 |
| S + A + M + T | 99 | 99.5 | 99.5 | 98.5 |
| Tg (° C.) | 740 | 735 | 745 | 740 |
| Heat treatment temperature of producing crystal nucleus (° C.) | Tg + 30 | Tg + 25 | Tg + 25 | Tg + 30 |
| Heat treatment of producing crystal nucleus (h) | 2 | 2 | 2 | 2 |
| Elevating speed of temperature (° C./h)* | 300 | 300 | 300 | 300 |
| Heat treatment temperature of crystallization (° C.) | 1000 | 1000 | 1000 | 1000 |
| Heat treatment time of crystallization (h) | 4 | 4 | 4 | 4 |
| Elevating speed of temperature (° C./h)** | 300 | 300 | 300 | 300 |
| Fracture surface | Glass | Glass | Glass | Glass |
| Transparency at a wavelength of 600 nm | 72% | 76% | 35% | 55% |
| Specific gravity (g/cc) | 3.12 | 3.14 | 3.05 | 3.08 |
| Young's modulus (GPa) | 145 | 149 | 139 | 142 |
| Poisson ratio | 0.221 | 0.22 | 0.231 | 0.232 |
| Specific modulus of elasticity (MNm/kg) | 46.5 | 47.5 | 45.6 | 46.1 |
| Kind of main crystals | Enstatite | Enstatite | Enstatite | Enstatite |
| Kind of other crystals | Titante | Titante | Titante | Titante |
| Thermal expansion coefficient ($10^{-7}$/° C.) | 68 | 72 | 62 | 65 |
| Average particle diameter (nm) | 20–30 | 20–30 | 50–70 | 30–50 |
| Ra (nm) | 0.3 | 0.3 | 0.5 | 0.4 |

Enstatite:Enstatite and its solid solution
S + A + M + T = $SiO_2$ + $Al_2O_3$ + MgO + $TiO_2$
*Elevating speed of temperature in the process of elevating temperature up to heat treatment temperature of producing crystal nucleus
**Elevating speed of temperature in the process of elevating temperature from heat treatment temperature of producing crystal nucleus to crystallization heat treatment temperature

TABLE 9

| Composition (mol %) | 29 | 30 | 31 | 32 |
|---|---|---|---|---|
| $SiO_2$ | 38.00 | 46.00 | 46.00 | 39.00 |
| $Al_2O_3$ | 8.00 | 10.50 | 10.50 | 11.00 |
| MgO | 36.50 | 28.00 | 27.00 | 35.00 |
| $K_2O$ | | 4.00 | 1.00 | |
| SrO | | | 3.50 | |
| $Y_2O_3$ | 5.00 | 0.50 | 0.50 | 1.00 |
| $ZrO_2$ | 3.00 | 2.00 | 2.00 | 1.00 |
| $TiO_2$ | 9.50 | 9.00 | 9.50 | 13.00 |
| $Al_2O_3$/MgO | | | | |
| $SiO_2$/MgO | 1.04 | 1.64 | 1.70 | 1.11 |
| S + A + M + T | 92 | 93 | 93 | 98 |
| Tg (° C.) | 730 | 715 | 735 | 741 |
| Heat treatment temperature of producing crystal nucleus (° C.) | Tg + 50 | Tg + 35 | Tg + 25 | Tg + 29 |
| Heat treatment of producing crystal nucleus (h) | 2 | 2 | 2 | 2 |
| Elevating speed of temperature (° C./h)* | 300 | 300 | 300 | 300 |
| Heat treatment temperature of crystallization (° C.) | 1000 | 1000 | 1000 | 1000 |
| Heat treatment time of crystallization (h) | 4 | 4 | 4 | 4 |
| Elevating speed of temperature (° C./h)** | 300 | 300 | 300 | 300 |
| Fracture surface | Glass | Glass | Glass | Glass |
| Transparency at a wavelength of 600 nm | 30% | 75% | 72% | 62% |
| Specific gravity (g/cc) | 3.41 | 3.012 | 3.124 | 3.39 |
| Young's modulus (GPa) | 191 | 138 | 146 | 182 |
| Poisson ratio | 0.241 | 0.223 | 0.221 | 0.242 |
| Specific modulus | 56.0 | 45.8 | 46.7 | 53.7 |

TABLE 9-continued

| Composition (mol %) | 29 | 30 | 31 | 32 |
|---|---|---|---|---|
| of elasticity (MNm/kg) | | | | |
| Kind of main crystals | Enstatite | Enstatite | Enstatite | Enstatite |
| Kind of other crystals | Titante | Titante | Titante | Titante |
| Thermal expansion coefficient ($10^{-7}/°$ C.) | 82 | 72 | 74 | 81 |
| Average particle diameter (nm) | 50–80 | 15–30 | 15–30 | 30–60 |
| Ra (nm) | 0.4 | 0.2 | 0.2 | 0.4 |

Enstatite:Enstatite and its solid solution
S + A + M + T = $SiO_2$ + $Al_2O_3$ + MgO + $TiO_2$
*Elevating speed of temperature in the process of elevating temperature up to heat treatment temperature of producing crystal nucleus
**Elevating speed of temperature in the process of elevating temperature from heat treatment temperature of producing crystal nucleus to crystallization heat treatment temperature

TABLE 10

| Composition (mol %) | 33 | 34 | 35 |
|---|---|---|---|
| $SiO_2$ | 46.00 | 46.00 | 46.00 |
| $Al_2O_3$ | 10.50 | 10.50 | 10.50 |
| MgO | 30.50 | 30.50 | 30.50 |
| $K_2O$ | 0.50 | 0.50 | 0.50 |
| $Y_2O_3$ | 0.50 | 0.50 | 0.50 |
| $ZrO_2$ | 2.00 | 2.00 | 2.00 |
| $TiO_2$ | 10.00 | 10.00 | 10.00 |
| $Al_2O_3$/MgO | 0.34 | 0.34 | 0.34 |
| $SiO_2$/MgO | 1.51 | 1.51 | 1.51 |
| S + A + M + T | 97 | 97 | 97 |
| Transition temperature Tg (° C.) | 728 | 728 | 728 |
| Heat treatment temperature of producing crystal nucleus (° C.) | 770 | 750 | 780 |
| Heat treatment time of producing crystal nucleus (h) | 1 | 1 | 1 |
| Elevating speed of temperature (° C./h)* | 1200 | 1200 | 1200 |
| Heat treatment temperature of crystallization (° C.) | 980 | 980 | 980 |
| Heat treatment time of crystallization (h) | 4 | 4 | 4 |
| Elevating speed of temperature (° C./h)** | 300 | 300 | 300 |
| Kind of fracture surface | Glass | Glass | Glass |
| Transparency at a wavelength of 600 nm | 72% | 72% | 72% |
| Specific gravity (g/cm³) | 3.115 | 3.113 | 3.113 |
| Young's modulus (GPa) | 146.2 | 146.0 | 146.1 |
| Poisson ratio | 0.232 | 0.231 | 0.232 |
| Kind of main crystals | Enstatite | Enstatite | Enstatite |
| Kind of other crystals | Titanate | Titanate | Titanate |
| Specific modulus of elasticity (MNm/kg) | 46.9 | 46.9 | 46.9 |
| Thermal expansion coefficient ($10^{-7}/°$ C.) | 73 | 73 | 73 |
| Average particle diameter (nm) | 20–30 | 20–30 | 20–30 |
| Ra (nm) | 0.20 | 0.20 | 0.20 |

Enstatite:Enstatite and its solid solution
S + A + M + T = $SiO_2$ + $Al_2O_3$ + MgO + $TiO_2$
*Elevating speed of temperature in the process of elevating temperature up to heat treatment temperature of producing crystal nucleus
**Elevating speed of temperature in the process of elevating temperature from heat treatment temperature of producing crystal nucleus to crystallization heat treatment temperature

TABLE 11

| Composition (mol %) | 36 | 37 | 38 |
|---|---|---|---|
| $SiO_2$ | 46.00 | 46.00 | 46.00 |
| $Al_2O_3$ | 10.50 | 10.50 | 10.50 |
| MgO | 30.50 | 30.50 | 30.50 |
| $K_2O$ | 0.50 | 0.50 | 0.50 |
| $Y_2O_3$ | 0.50 | 0.50 | 0.50 |
| $ZrO_2$ | 2.00 | 2.00 | 2.00 |
| $TiO_2$ | 10.00 | 10.00 | 10.00 |
| $Al_2O_3$/MgO | 0.34 | 0.34 | 0.34 |
| $SiO_2$/MgO | 1.51 | 1.51 | 1.51 |
| S + A + M + T | 97 | 97 | 97 |
| Transition temperature Tg (° C.) | 728 | 728 | 728 |
| Heat treatment temperature of producing crystal nucleus (° C.) | 800 | 770 | 770 |
| Heat treatment time of producing crystal nucleus (h) | 1 | 0.5 | 0.5 |
| Elevating speed of temperature (° C./h)* | 1200 | 1200 | 1200 |
| Heat treatment temperature of crystallization (° C.) | 980 | 980 | 980 |
| Heat treatment time of crystallization (h) | 4 | 1 | 3 |
| Elevating speed of raising of temperature (° C./h)** | 300 | 300 | 300 |
| Kind of fracture surface | Glass | Glass | Glass |
| Transparency at a wavelength of 600 nm | 72% | 76% | 72% |
| Specific gravity (g/cm³) | 3.111 | 3.104 | 3.110 |
| Young's modulus (GPa) | 146.0 | 145.5 | 145.4 |
| Poisson ratio | 0.231 | 0.232 | 0.232 |
| Kind of main crystals | Enstatite | Enstatite | Enstatite |
| Kind of other crystals | Titanate | Titanate | Titanate |
| Specific modulus of elasticity (MNm/kg) | 46.9 | 46.9 | 46.8 |
| Thermal expansion coefficient ($10^{-7}/°$ C.) | 73 | 73 | 73 |
| Average particle diameter (nm) | 20–30 | 20–30 | 20–30 |
| Ra (nm) | 0.20 | 0.20 | 0.20 |

Enstatite:Enstatite and its solid solution
S + A + M + T = $SiO_2$ + $Al_2O_3$ + MgO + $TiO_2$
*Elevating speed of temperature in the process of elevating temperature up to heat treatment temperature of producing crystal nucleus
**Elevating speed of temperature in the process of elevating temperature from heat treatment temperature of producing crystal nucleus to crystallization heat treatment temperature

TABLE 12

| Composition (mol %) | 39 | 40 | 41 | 42 |
|---|---|---|---|---|
| $SiO_2$ | 46.00 | 46.00 | 46.00 | 46.00 |
| $Al_2O_3$ | 10.50 | 10.50 | 10.50 | 10.50 |
| MgO | 30.50 | 30.50 | 30.50 | 30.50 |
| $K_2O$ | 0.50 | 0.50 | 0.50 | 0.50 |
| $Y_2O_3$ | 0.50 | 0.50 | 0.50 | 0.50 |
| $ZrO_2$ | 2.00 | 2.00 | 2.00 | 2.00 |
| $TiO_2$ | 10.00 | 10.00 | 10.00 | 10.00 |
| $Al_2O_3$/MgO | 0.34 | 0.34 | 0.34 | 0.34 |
| $SiO_2$/MgO | 1.51 | 1.51 | 1.51 | 1.51 |
| S + A + M + T | 97 | 97 | 97 | 97 |
| Transition temperature Tg (° C.) | 728 | 728 | 728 | 728 |
| Heat treatment temperature of producing crystal nucleus (° C.) | 770 | 770 | 700 | 700 |
| Heat treatment time of producing crystal nucleus (h) | 0.5 | 0.5 | 2 | 2 |
| Elevating speed of temperature (° C./h)* | 1200 | 1200 | 1200 | 1200 |
| Heat treatment temperature of crystallization (° C.) | 875 | 970 | 970 | 1025 |
| Heat treatment time of crystallization (h) | 2 | 2 | 2 | 2 |
| Elevating speed of temperature (° C./h)** | 300 | 300 | 300 | 300 |
| Kind of fracture surface | Glass | Glass | Glass | Glass |
| Transparency at a wavelength of 600 nm | 75% | 75% | 75% | 75% |
| Specific gravity (g/cm³) | 3.057 | 3.101 | 3.111 | 3.111 |
| Young's modulus (GPa) | 137.8 | 144.1 | 144.70 | 144.70 |
| Poisson ratio | 0.233 | 0.233 | 0.221 | 0.221 |
| Kind of main crystals | Enstatite | Enstatite | Enstatite | Enstatite |
| Kind of other crystals | Titanate | Titanate | Titanate | Titanate |
| Specific modulus of elasticity (MNm/kg) | 45.1 | 46.5 | 46.5 | 46.5 |
| Thermal expansion coefficient ($10^{-7}$/° C.) | 71 | 73 | 73 | 73 |
| Average particle diameter (nm) | 15–20 | 20–30 | 20–30 | 20–30 |
| Ra (nm) | 0.20 | 0.30 | 0.30 | 0.30 |

Enstatite:Enstatite and its solid solution
S + A + M + T = $SiO_2$ + $Al_2O_3$ + MgO + $TiO_2$
*Elevating speed of temperature in the process of elevating temperature up to heat treatment temperature of producing crystal nucleus
**Elevating speed of temperature in the process of elevating temperature from heat treatment temperature of producing crystal nucleus to crystallization heat treatment temperature

TABLE 13

| | Comparative Example | |
|---|---|---|
| Oxide | 1<br>Chemically tempered glass<br>Japanese Patent Unexamined<br>PublicationNo.Hei.1-239036<br>(JP-A-239036/89) | 2<br>Commercially<br>available TS-10<br>crystallized glass<br>U.S. Pat. No.<br>2516553 |
| $SiO_2$ | 73.0 | |
| $Al_2O_3$ | 0.6 | |
| CaO | 7.0 | |
| $Na_2O$ | 9.0 | |
| $K_2O$ | 9.0 | |
| ZnO | 2.0 | |
| $As_2O_3$ | 0.2 | |
| Young's modulus (GPa) | 79 | 90–100 |
| Surface roughness Ra (nm) | 12 | 10–35 |

(1) Determination of Kinds of Crystals

The X-ray diffraction was measured using $K_\alpha$-ray of Cu with respect to a powder forming from glass after crystallization (apparatus: X-ray diffraction apparatus MXP18A manufactured by Mac Science Co. Ltd., tube voltage: 50 kV, tube current: 300 mA, scanning angle: 10 to 90°). The deposited crystals were determined from peaks observed in the resulting X-ray diffraction.

(2) Measurement Method of Physical Characteristics
Measurement of Specific Gravity (Density)

The crystallized glass sample itself was used as a sample for the specific gravity measurement. An electron specific gravity meter (MD-200S manufactured by Mirage trade Co. Ltd.) utilizing the Archimedes method was used. The specific gravity was determined at room temperature with accuracy of ±0.001 g/cm³.

Measurement of Young's Modulus

Before measuring the Young's modulus, with a sample with parallel surfaces having the end area of from 10 mm squares to 20 mm squares and the length of from 50 to 100 mm, the specific gravity (density) was measured and the sample length was measured with a slide caliper, then these were used as measurement conditions. UVM-2 manufactured by Ultrasonic wave Industry Co. Ltd. was used. When the longitudinal wave (T11, T12) and the transverse wave (TS1, TS2) were measured, "water" in the case of longitudinal wave and "Sonicoat SHN20 or SHN-B25" in the case of transverse wave were coated between the deep probe and sample end side. The same sample was subjected to the repeatedly measurement in twice or more times for the longitudinal wave and fifth or more times for the transverse wave, then calculating the average values. It is to be noted that the Poisson ratio was obtained at the same time by this operation. The elastic modulus and Poisson's ratio were examined with accuracies of ±1 GPa and ±0.001.

Thermal Mechanical Analysis

Test pieces were cut off from the crystallized glass after crystallization, subjected to polishing process as to form a column shape of φ5 mm×20 mm, then they were used as samples for TMA measurement. TAS100 manufactured by Rigaku Co. Ltd. was used as a measurement apparatus. The measurement conditions were set as the elevating speed of temperature was 4 K/min. and the maximum temperature was 350° C.

Atomic Force Microscopy

The crystallized glass samples were processed as to form pieces having a size of 30×2×1 mm, and subjected to optical precise polishing to give two plane surfaces having a size of 30×15 mm, then they were used as samples for AFM measurement. Nano Scope III manufactured by Digital Instrument Co. Ltd. was used. As for the measurement conditions, the measurement area was set as 2×2 μm or 5×5 μm, the number of samples was set as 256×256 and scan rate was set as 1 Hz with Tapping mode AFM as well as the data processing conditions were set as Planefit Auto order 3 (X, Y) and Flatten Auto order 3. Integral grain, Proportion gain and Set point were adjusted at each measurement. It is to be noted that, as pretreatment of the measurement, the polished samples were washed with pure water, IPA or the like in a large washing machine in a clean room.

Transparency Measurement

The piece having a thickness of 1 mm subjected to optical precise polishing at two planes was used as a sample for transparency measurement. Spectroscope U-3410 manufactured by HITACHI Co. Ltd. was used and the measurement wavelength was set at 600 nm.

Degree of Crystallinity

All scattering intensity of X-ray was measurement with respect to crystallized glass samples. From the results, the degree of crystallinity can be calculated by the following equation. X-ray diffraction apparatus MXP18A manufactured by Mac Science Co.Ltd. was used as a X-ray diffraction apparatus.

$$x=(1-(\Sigma 1a/\Sigma 1a10))\times 100$$

$$x=(\Sigma 1c/\Sigma 1c100)\times 100$$

1a: Scattering intensity of an amorphous part of an unknown material

1c: Scattering intensity of a crystalline part of an unknown material

1a100: Scattering intensity of a material containing 100% of amorphous.

1c100: Scattering intensity of a material containing 100% of crystal

Measurement of Thermal Expansion Coefficient

Glass samples were cut off, and subjected to polishing process as to form a column shape of φ5 mm×20 mm, then they were used as samples for TMA measurement. TAS100 manufactured by Rigaku Co. ltd. was used as a measurement apparatus. As for the measurement conditions, the elevating speed of temperature was set as 4K/min., the maximum temperature was set as 350° C., and then the thermal expansion coefficients at from 100 to 300° C. were measured.

As seen from the results shown in Tables 1 to 12, the crystallized glasses of the present invention in Examples 1 to 42 had characteristics of strength, such as the Young's modulus (equal to or higher than 140 GPa), the specific modulus of elasticity (in the range of from 40 to 60 MNm) and the like in a large value. Therefore, in the case of using these glasses as substrates for information recording medium such as a magnetic recording medium, even if these glass substrates are rotated at a high speed, they are not likely to exhibit warp or walking, and hence it is understood that they can meet the demand of further thinner substrates. In addition, when the liquid phase temperature was measured with respect to glasses before heat treatment in Example 1, Example 4 and Example 10, the temperature was 1300° C., 1290° C. and 1270° C., respectively, which satisfy the liquid phase temperature (for example, equal to or less than 1350° C.) required from the viewpoint of glass melting and molding. In addition, when the average particle diameter of the crystal particle was measured with a Transmission Electron Microscopy (TEM) with respect to the crystallized glass in Examples 1 to 42, the particles having the average particle diameter of from 20–30 nm to 100–150 nm were observed. In addition, the polished planes subjected to optical glass polishing for surface roughness measurement were subjected to surface observation with an Atomic Force Microscopy (AFM) with respect to the crystallized glass in all Examples. From the results, the surface roughness (Ra (JIS B0601)) of the crystallized glasses other than in Examples 20, 21 and 24 was equal to or less than 0.5 nm. The surface roughness (Ra (JIS B0601)) of these crystallized glasses can be polished to equal to or less than 0.5 nm with, for example, the polishing method for conventional optical glass using abrasives such as synthesis diamond, silicon carbide, calcium oxide, iron oxide, cerium oxide. Therefore, substrates excellent in flatness can be obtained and it is useful as glass substrates for magnetic recording media for the purpose of smaller flying height. The crystallized glass of the present invention had the light transparency equal to or higher than 50% at a wavelength of 600 nm in the case of the thickness of 1 mm and had transparency to some extent. Such transparency can be an index showing whether desirable kinds of crystals and particle diameter of crystals are obtained. In the case of the crystallized glass of the present invention, said transparency can range, for example, from 60 to 90%. For example, as the particle diameter of the crystal was smaller, so said transparency becomes larger.

On the contrary, while the chemically reinforced glass substrate in Comparative Example 1 shown in Table 13 was excellent in the surface smoothness and flatness, it was much inferior in characteristics of strength such as heat resistance and the Young's modulus than the crystallized glass of the present invention. Accordingly, when magnetic recording media were produced, heat treatment to a magnetic layer for obtaining high coercive force could not be carried out sufficiently, thereby the magnetic recording media having high coercive force could not be obtained. In addition, the glass in Comparative Example 1 contained large amount of alkali, so that the collosion of the magnetic film with the substrate easily occurred, thereby it was afraid that the magnetic film was damaged.

In addition, the crystallized glass substrate in Comparative Example 2 was inferior in the Young's modulus and smoothness than the glass of the present invention. In particular, because the smoothness of the substrate was deteriorated by the existence of large crystal particles, it was difficult to attempt high-density recording.

Production Method of Magnetic Disk

As exhibited in FIG. 1, the magnetic disk 1 of the present invention comprises a crystallized glass substrate 2 in said Example 1, on which unevenness control layer 3, underlying layer 4, magnetic layer 5, protective layer 6 and lubricating layer 7 are provided in this order.

Each layer will be explained in detail. The substrate 2 was a disk having an outer circular periphery radius of 32.5 mm, inner circular periphery radius of 10.0 mm and thickness of 0.43 mm, whose main surfaces were subjected to precision polishing so that they should have surface roughness Ra of 4 Å and $R_{max}$ of 40 Å.

The unevenness control layer is a thin AlN layer of 5–35% nitrogen content having average roughness of 50 Å and surface roughness $R_{max}$ of 150 Å.

The underlying layer is a thin layer of CrV composed of Cr: 83 at % and V: 17 at % having a thickness of about 600 Å.

The magnetic layer is a thin layer of CoPtCr composed of Co: 76 at %, Pt: 6.6 at %, Cr: 17.4 at % having a thickness of about 300 Å.

The protective layer is a carbon thin layer having a thickness of about 100 Å.

The lubricating layer is a layer having a thickness of 8 Å, which was formed by applying perfluoropolyether on the carbon protective layer by spin coating.

The method for producing magnetic disks will be explained hereinafter.

The crystallized glass of Example 1 was cut into a disk having an outer circular periphery radius of 32.5 mm, inner circular periphery radius of 10.0 mm and thickness of 0.5 mm and the both main surfaces were subjected to precision polishing so that they should have surface roughness Ra of 4 Å and $R_{max}$ of 40 Å to afford a crystallized glass substrate for magnetic recording medium.

Subsequently, the above crystallized glass substrate was placed on a substrate holder and transferred into a charging chamber of inline sputtering apparatus. Then, the holder on which the crystallized glass substrate was placed was transferred to a first chamber where an Al target was etched and sputtering was performed at a pressure of 4 mtorr and substrate temperature of 350° C. in an atmosphere of Ar+$N_2$ gas ($N_2$=4%). As a result, an AlN thin layer having surface roughness $R_{max}$ of 150 Å and thickness of 50 Å (unevenness forming layer) was provided on the crystallized glass substrate.

The holder on which the crystallized glass substrate having the formed AlN layer was placed was then transferred into a second chamber provided with a CrV target (Cr: 83 at %, V: 17 at %) and second chamber provided with a CoPtCr target (Co: 76 at %, Pt: 6.6 at %, Cr: 17.4 at %) successively, and thin layers were formed on the substrate. Sputtering was performed at a pressure of 2 mtorr and substrate temperature of 350° C. in an Ar atmosphere, thereby a CrV underlying layer having a thickness of about 600 Å and CoPtCr magnetic layer having a thickness of about 300 Å were formed.

The substrate having the formed unevenness control layer, underlying layer and magnetic layer was then transferred to a fourth chamber provided with a heater for heat-treatment. The fourth chamber had an inner atmosphere of Ar gas (pressure: 2 mtorr) and the heat treatment was performed with changing the heat treatment temperature.

The substrate was then transferred into a fifth chamber provided with a carbon target, and a carbon protective layer having a thickness of about 100 Å was formed under the same condition as used for forming of the CrV underlying layer and the CoPtCr magnetic layer except that the layer was formed in an atmosphere of Ar+$H_2$ gas ($H_2$=6%).

Finally, the substrate after forming the carbon protective layer was taken out from the above inline sputtering apparatus, and a lubricating layer having a thickness of 8 Å was formed by applying perfluoropolyether on the carbon protective layer by dipping.

The substrate for information recording medium of the present invention can be easily molded, and has the large Young's modulus equal to or higher than 140 GPa, high heat resistance, excellent surface productivity and surface smoothness (less than 10 Å of surface roughness Ra (JIS B0601)), as well as it can be used as a substrate material having large hardness and strength.

In addition, because the substrate composed of the crystallized glass of the present invention is excellent in heat resistance, heat treatment required for improving characteristics of magnetic films can be used without deformation of substrates. Because it is excellent in flatness, smaller flying height, that is, high-density recording, can be accomplished. Because it has high Young's modulus, specific modulus of elasticity and strength, it has advantages that thinner magnetic disks can be obtained and the magnetic disks can rotate at a high speed while avoiding the fracture of the magnetic disks.

In addition, the crystallized glass of the present invention can be produced with relative stability, and production in the industrial scale can be done easily, so that it can be greatly expected as substrate glasses for cheap magnetic recording media in the next generation.

I claim:

1. A substrate for an information recording medium composed of crystallized glass comprising $SiO_2$, $Al_2O_3$, MgO and alkali metal oxides and being substantially free of ZnO, wherein the crystallized glass comprises $Al_2O_3$ in an amount of 5 to 25 mol % and alkali metal oxides in an amount equal to or less than 5 mol %, main crystals contained in the crystallized glass consist of enstatite and/or its sold solution, thermal expansion coefficient of the crystallized glass at 100 to 300° C. is in the range of from $65 \times 10^{-7}$ to $85 \times 10^{-7}$/° C., and the substrate has a polished surface with a surface roughness Ra (JIS B0601) equal to or less than 1 nm.

2. A substrate for an information recording medium composed of crystallized glass comprising $SiO_2$, $Al_2O_3$, MgO, $Y_2O_3$ and alkali metal oxides, wherein the crystallized glass comprises $Al_2O_3$ in an amount of 5 to 25 mol %, alkali metal oxides in an amount equal to or less than 5 mol % and $Y_2O_3$ in an amount of 0.3 to 10 mol %, main crystals contained in the crystallized glass consist of enstatite and/or its solid solution, and the substrate has a polished surface with a surface roughness Ra (JIS B0601) equal to or less than 1 nm.

3. A substrate for an information recording medium composed of crystallized glass comprising $SiO_2$, $Al_2O_3$, MgO and alkali metal oxides, and being substantially free of ZnO, wherein the crystallized glass comprises $Al_2O_3$ in an amount of 5 to 25 mol %, alkali metal oxides in an amount equal to or less than 5 mol %, wherein $K_2O$ is present in an amount which ranges from 0.1 to 2 mol %, main crystals contained in the crystallized glass consist of enstatite and/or its solid solution, and the substrate has a polished surface with a surface roughness Ra (JIS B0601) equal to or less than 1 nm.

4. The substrate according to claim 1, wherein the crystallized glass further contains $Y_2O_3$ in an amount of 0.3 to 10 mol %.

5. The substrated to claim 1, wherein $Al_2O_3$ is present in an amount of 7 to 22 mol %.

6. The substrate according to claim 2, wherein $Al_2O_3$ is present in an amount of 7 to 22 mol %.

7. The substrate according to claim 3, wherein $Al_2O_3$ is present in an amount of 7 to 22 mol %.

8. The substrate according to claim 1, wherein the thermal expansion coefficient of the crystallized glass to 100 to 300° C. is in the range of from $73\times10^{-7}$ to $83\times10^{-7}/°$ C.

9. The substrate according to claim 1, wherein the crystallized glass comprises $Al_2O_3$ in an amount of 7 to 22 mol % and the thermal expansion coefficient of the crystallized glass at 100 to 300° C. is in the range of from $73\times10^{-7}$ to $83\times10^{-7}/°$ C.

10. The substrate according to claim 1, wherein the crystallized glass further contains $K_2O$ in an amount of 0.1 to 2 mol %.

11. The substrate according to claim 2, wherein the crystallized glass further contains $K_2O$ in an amount of 0.1 to 2 mol %.

12. The substrate according to claim 1, wherein the crystallized glass comprises:
$SiO_2$: 35 to 65 mol %
MgO: 10 to 40 mol % and
$TiO_2$: 5 to 15 mol %,
wherein the sum of $SiO_2$, $Al_2O_3$, MgO and $TiO_2$ is equal to or more than 93 mol % and a molar ratio of $Al_2O_3$ to MgO is less than 0.5.

13. The substrate according to claim 2, wherein the crystallized glass comprises:
$SiO_2$: 35 to 65 mol %
MgO: 10 to 40 mol % and
$TiO_2$: 5 to 15 mol %,
wherein the sum of $SiO_2$, $Al_2O_3$, MgO and $TiO_2$ is equal to or more than 93 mol % and a molar ratio of $Al_2O_3$ to MgO is less than 0.5.

14. The substrate according to claim 3, wherein the crystallized glass comprises:
$SiO_2$: 35 to 65 mol %
MgO: 10 to 40 mol % and
$TiO_2$: 5 to 15 mol %,
wherein the sum of $SiO_2$, $Al_2O_3$, MgO and $TiO_2$ is equal to or more than 93 mol % and a molar ratio of $Al_2O_3$ to MgO is less than 0.5.

15. The substrate according to claim 1, wherein the crystallized glass comprises:
$SiO_2$: 35 to 65 mol %
$Al_2O_3$: 7 to 22 mol %
MgO: 10 to 40 mol %, and
$TiO_2$: 5 to 15 mol %,
wherein the sum of $SiO_2$, $Al_2O_3$, MgO and $TiO_2$ is equal to or more than 93 mol % and a molar ratio of $Al_2O_3$ to MgO is less than 0.5.

16. The substrate according to claim 2, wherein the crystallized glass comprises:
$SiO_2$: 35 to 65 mol %
$Al_2O_3$: 7 to 22 mol %
MgO: 10 to 40 mol %, and
$TiO_2$: 5 to 15 mol %,
wherein the sum of $SiO_2$, $Al_2O_3$, MgO and $TiO_2$ is equal to or more than 93 mol % and a molar ratio of $Al_2O_3$ to MgO is less than 0.5.

17. The substrate according to claim 3, wherein the crystallized glass comprises:
$SiO_2$: 35 to 65 mol %
$Al_2O_3$: 7 to 22 mol %
MgO: 10 to 40 mol %, and
$TiO_2$: 5 to 15 mol %,
wherein the sum of $SiO_2$, $Al_2O_3$, MgO and $TiO_2$ is equal to or more than 93 mol % and a molar ratio of $Al_2O_3$ to MgO is less than 0.5.

18. The substrate according to claim 2, wherein the crystallized glass is substantially free of ZnO.

19. The substrate according to claim 1, wherein the substrate has a polished swface with a surface roughness Ra (JIS B0601) equal to or less than 0.5 nm.

20. The substrate according to claim 2, wherein the substrate has a polished surface with a surface roughness Ra (JIS B0601) equal to or less than 0.5 nm.

21. The substrate according to claim 3, wherein the substrate has a polished surface with a surface roughness Ra (JIS B0601) equal to or less than 0.5 nm.

22. The substrate according to claim 1, wherein light transparency at 600 nm through the substrate with 1 mm thickness is equal to or more than 10%.

23. The substrate according to claim 2, wherein light transparency at 600 nm through the substrate with 1 mm thickness is equal to or more than 10%.

24. The substrate according to claim 3, wherein light transparency at 600 nm through the substrate with 1 mm thickness is equal to or more than 10%.

25. The substrate according to claim 1, wherein the crystallization degree of the crystallized glass is equal to or more than 50 vol %, as well as in the crystalline phase, the total content of enstatite and/or its solid solution ranges from 70 to 90 vol %, titanate is present in an amount which ranges from 10 to 30 vol %, and the sum of enstatite and/or its solid solution and titanate is equal to or more than 90 vol %.

26. The substrate according to claim 2, wherein the crystallization degree of the crystallized glass is equal to or more than 50 vol %, as well as in the crystalline phase, the total content of enstatite and/or its solid solution ranges from 70 to 90 vol %, titanate is present in an amount which ranges from 10 to 30 vol %, and the sum of enstatite and/or its solid solution and titanate is equal to or more than 90 vol %.

27. The substrate according to claim 3, wherein the crystallization degree of the crystallized glass is equal to or more than 50 vol %, as well as in the crystalline phase, the total content of enstatite and/or its solid solution ranges from 70 to 90 vol %, titanate is present in an amount which ranges from 10 to 30 vol %, and the sum of enstatite and/or its solid solution and titanate is equal to or more than 90 vol %.

28. The substrate according to claim 1, wherein the crystallized glass is substantially free of spinel as a crystal phase.

29. The substrate according to claim 2, wherein the crystallized glass is substantially free of spinel as a crystal phase.

30. The substrate according to claim 3, wherein the crystallized glass is substantially free of spinel as a crystal phase.

* * * * *